United States Patent [19]

Gannon et al.

[11] 4,149,245

[45] Apr. 10, 1979

[54] HIGH SPEED STORE REQUEST PROCESSING CONTROL

[75] Inventors: Patrick M. Gannon; Kian-Bon K. Sy, both of Poughkeepsie, N.Y.

[73] Assignee: International Business Machines Corporation, Armonk, N.Y.

[21] Appl. No.: 805,065

[22] Filed: Jun. 9, 1977

[51] Int. Cl.² .................... G06F 13/06; G06F 9/18
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,593,314 | 7/1971 | Moll | 364/200 |
| 3,623,006 | 11/1971 | Balakian et al. | 364/200 |
| 4,028,663 | 6/1977 | Royer et al. | 364/900 |
| 4,070,706 | 1/1978 | Scheuneman | 364/200 |

*Primary Examiner*—Mark E. Nusbaum
*Attorney, Agent, or Firm*—Bernard M. Goldman

[57] ABSTRACT

The described embodiment provides storage control (PSCF) for overlapping the handling of processor store requests between their generation by an instruction execution means (IPPF) and their presentation to system main storage (MS).

The embodiment uses a store counter, an inpointer counter, an outpointer counter, a translator pointer register, an output counter and a plurality of registers sets to process and control the sequencing of all store requests so that the PSCF can output them to MS in the order received from the IPPF. The embodiment uses the counters to coordinate the varying delays in PSCF processing of plural store request contained in different register sets and the translator.

The store counter obtains independence between plural IPPF operand address (OA) registers which send the store requests and plural PSCF register sets which handle the store request. The number of OA registers is made independent of the number of register sets. The store counter is also used for serializing instruction control.

36 Claims, 15 Drawing Figures

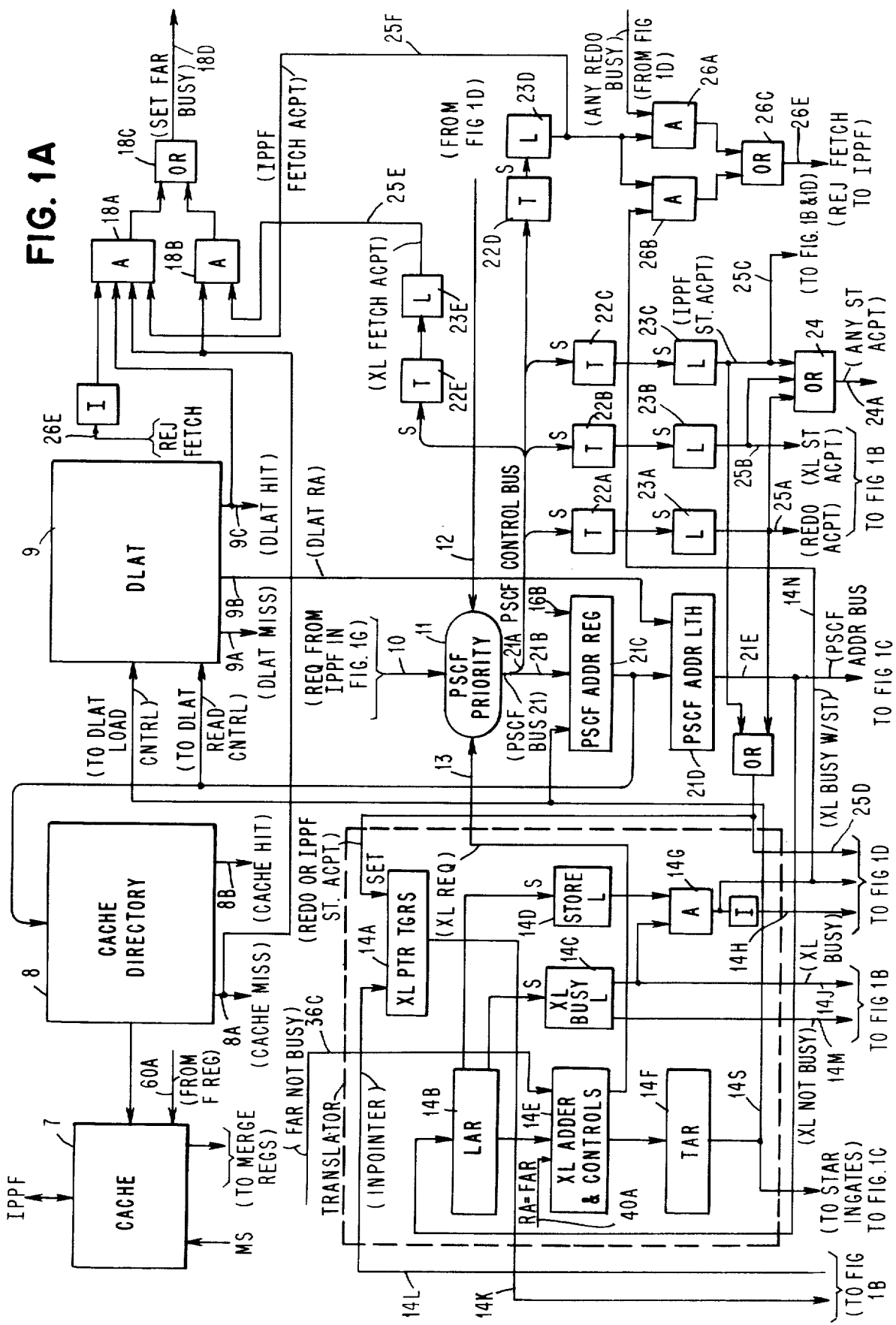

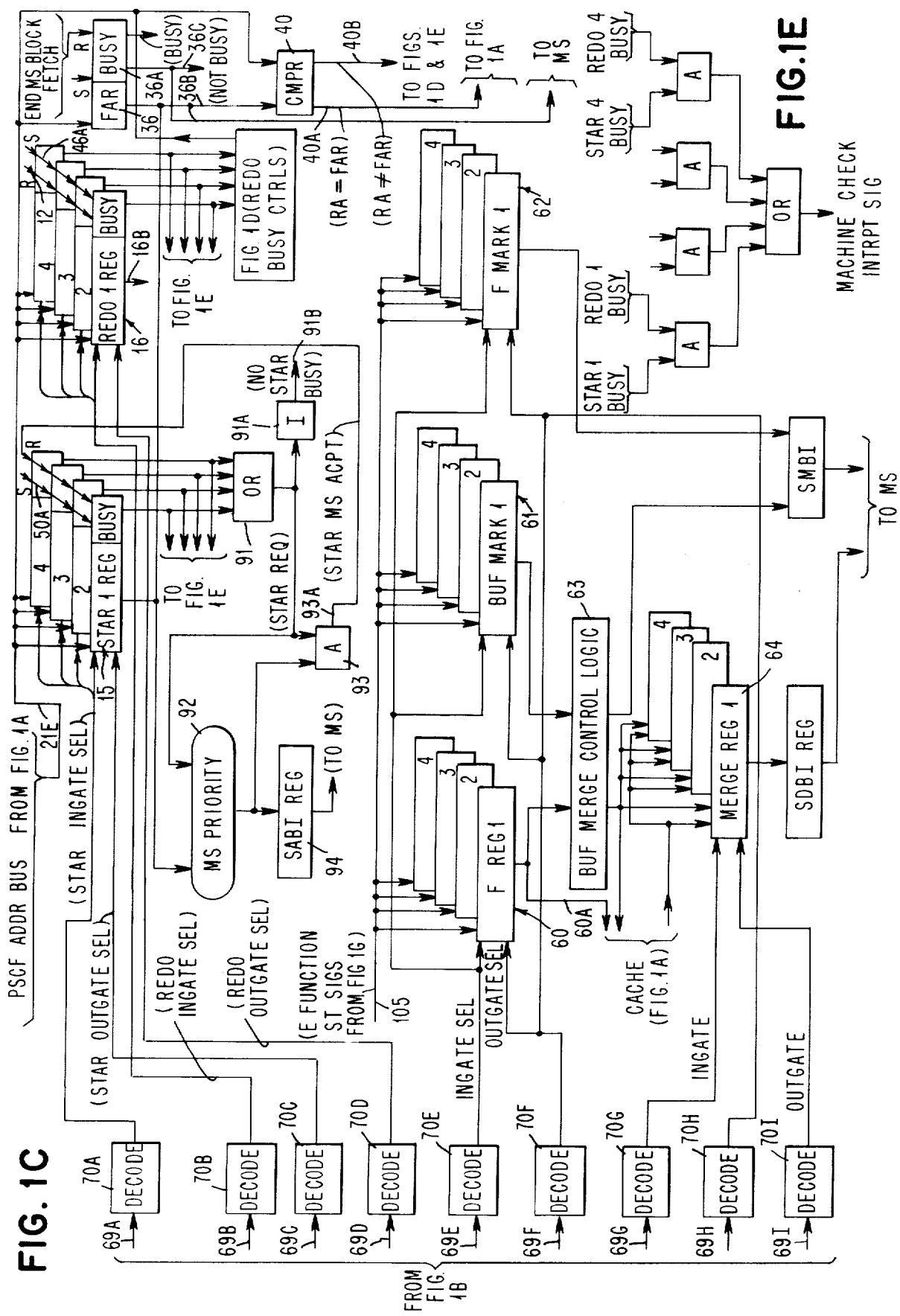

XL CONTROLS

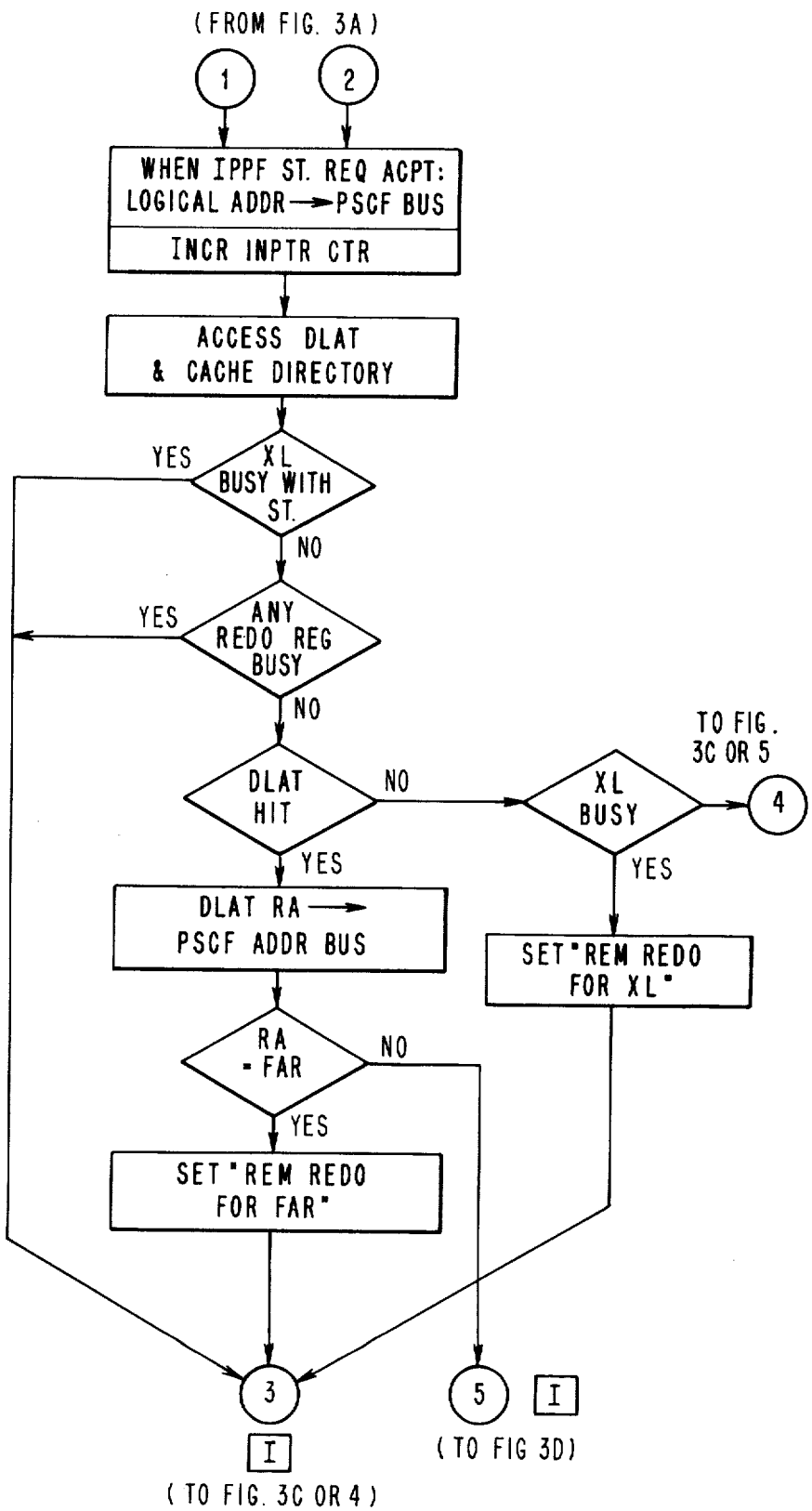
FIG. 3B (PSCF SEQUENCING CONTROLS FOR STORAGE REQUESTS)

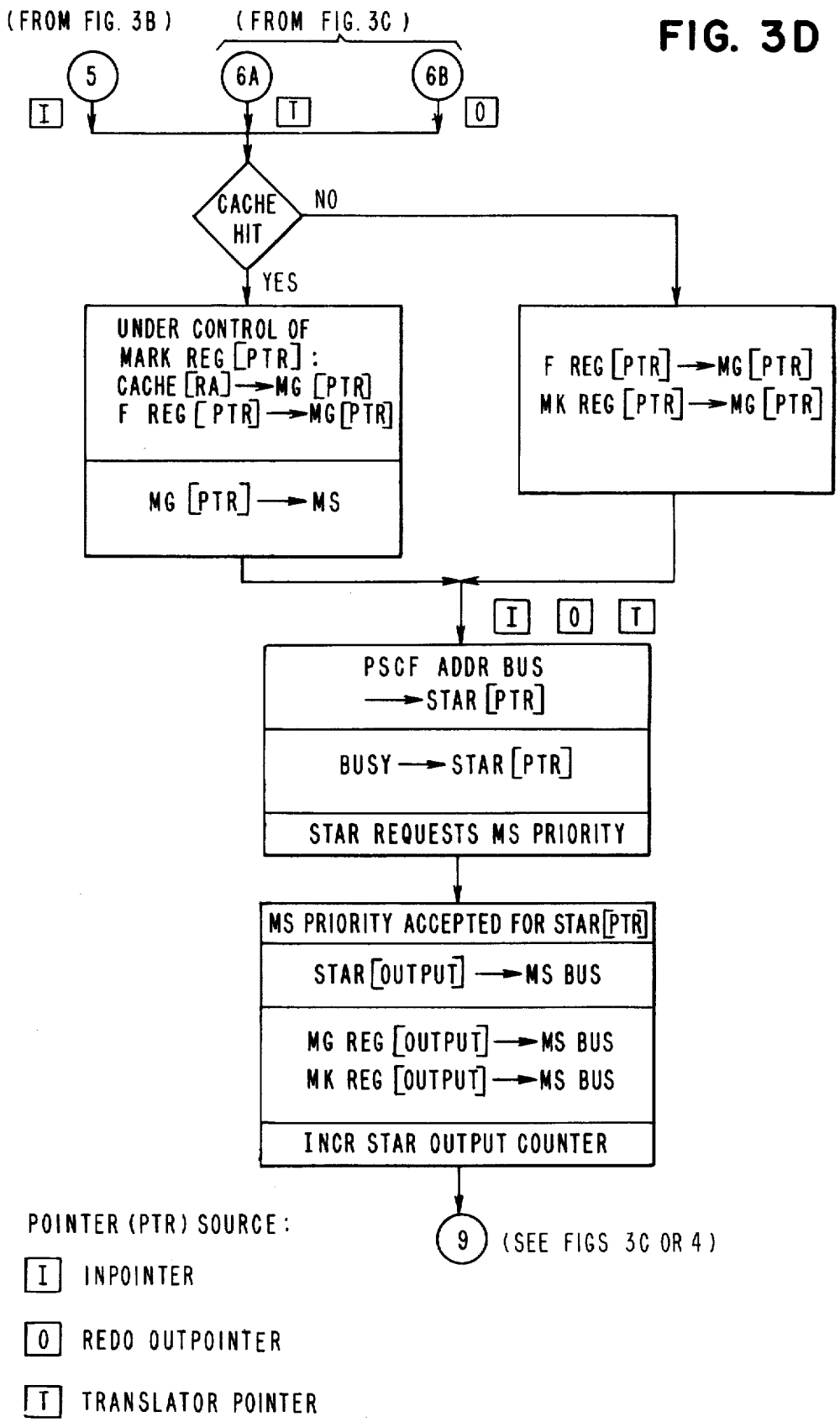

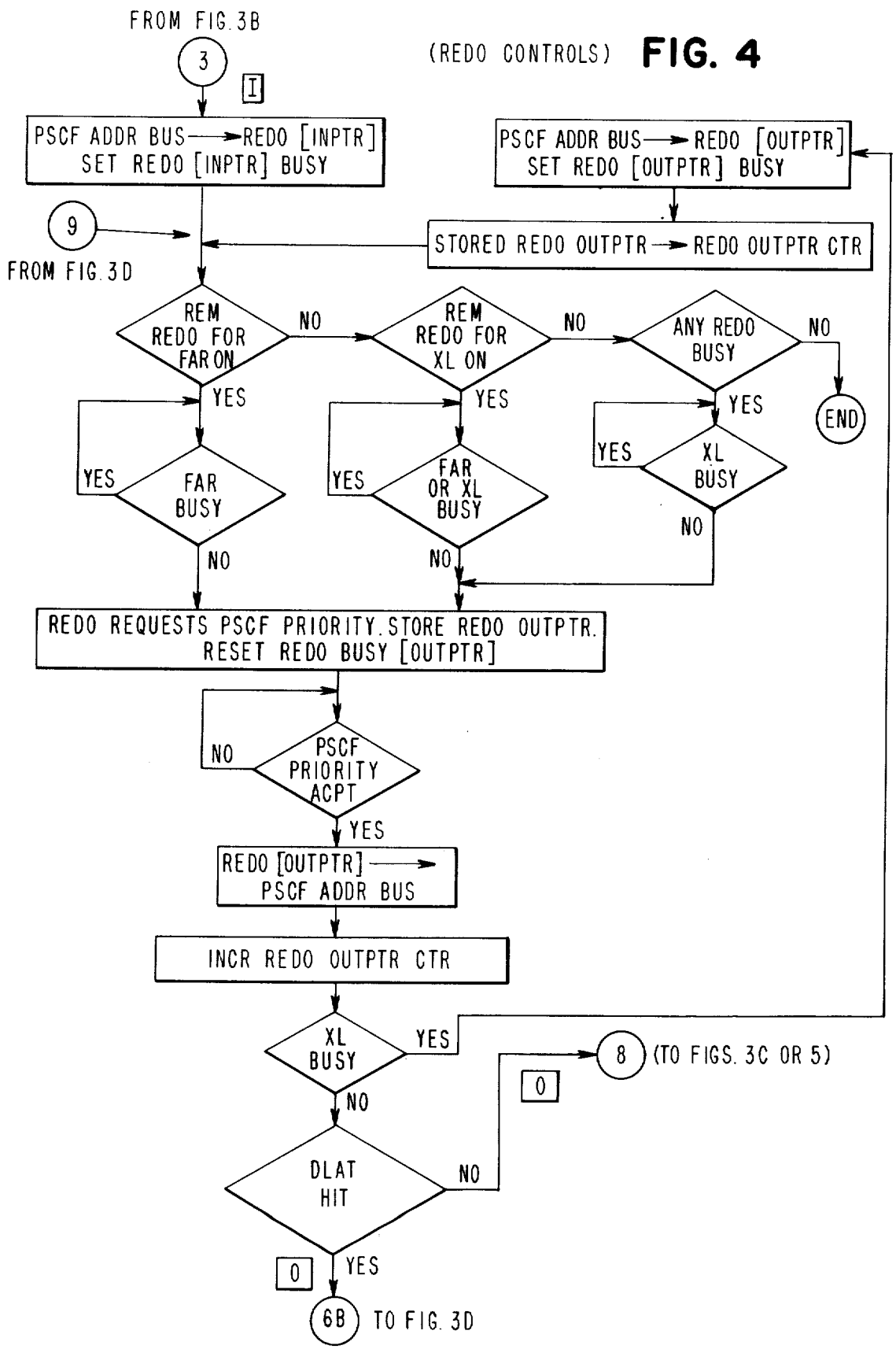

HIGH SPEED STORE REQUEST PROCESSING CONTROL

INTRODUCTION

This invention relates primarily to store request handling in a storage control function that substantially increases the speed of processing for store access requests in a processor. The invention is concerned with fetch requests to main storage to the extent that they interfere with store request handling in maintaining a required sequence between fetch and store requests to main storage. The improved storage control function permits multiple store requests to be overlapped under counter control while they are individually being processed, which may cause different amounts of processing delay before the requests can be used to access main storage. The store requests may be processed out of the sequence in which the store requests were received by the storage control function, but the store requests are outputted to main storage in the received sequence.

PRIOR ART

The most pertinent prior art of which the subject inventors are aware is the Processor Storage Control Function (PSCF) circuitry in the IBM S/370 Model 168-III Processor. It permitted two store requests to be received by the PSCF from the instruction preprocessing function (IPPF) in two successive machine cycles followed by two cycles during which no store request is permitted. Hence, the 168 PSCF store request rate is one-half the machine cycle rate.

The M168-III IPPF has two OA registers, and its PSCF has two matching store request register sets. Each OA register can output only to one register set. Each register set in the 168-III contains a STAR (Storage Address Register), an F register for receiving a double word of data to be stored, and a mark register to indicate which bytes in the F register were changed. Each 168 store request register set does not contain a redo register. A single redo register is provided external to both register sets for receiving either a fetch or store request delayed in the 168 PSCF. The 168 redo register passes its fetch request to main storage and passes its store request to the STAR associated with either F register which received the data with the respective store request. In the M168 PSCF, one delayed fetch or store request could be handled in the redo register, and another fetch or store request could be handled in the translator; and no register set could be used while the redo register or translator was busy.

All store requests in the 168 were provided from the two operand address (OA) registers in its IPPF. Each OA register can output to only one predetermined store request register set in the PSCF. Furthermore, an OA register can not receive another storage request until it is released by its matching register set outgating it respective store request to main storage.

An access request delay can be caused by any of several occurrences in the 168 PSCF, such as (1) if the logical address provided with the access request must be translated into its absolute address because it is not available in the translation look-aside buffer (DLAT), or (2) the redo register is busy with a prior request, or (3) a fetch request occurs while a prior fetch request block transfer is underway at any address, or (4) a store request occurs while a block fetch is underway at the store request's address. Many machine cycles of delay are involved in the PSCF processing of a request.

The 168 redo register is ingated if a request cannot be ingated into the FAR, STAR1, STAR2, or the translator logical address register (LAR).

Therefore, the M168 redo register (if available) is ingated with a (1) fetch request, when the fetch request address register (FAR) is busy (indicating a block fetch), or (2) store request, when FAR is controlling a fetch at the store request address, or (3) fetch or store request having a DLAT miss when the translator is busy with a prior request.

The 168 translator is ingated (without ingating the redo register) if the translator is not busy on the occurrence of a fetch or store request having a DLAT miss.

The prior art contains other less pertinent storage access control techniques for sequencing fetch and store requests, such as U.S. Pat. No. 3,670,309 which solved the problem in a different manner by providing a sequence interlock vector in each access request entry in a storage request stack. Both fetch and store requests are put into either request stack, and a flag is set in a respective entry to indicate whether it is a fetch or store request.

The sequence interlock vector is provided by a sequence interlock generator that sets certain bits in the current stack entry to chain the entry to other entries in the stack to indicate their received sequence for accessing the requests represented in the stacks. The interlock vector is comprised of bits which identify the levels (i.e. other entries) to which each tag is interlocked to obtain the sequencing.

U.S. Pat. No. 3,462,744 provides still another technique for maintaining the sequencing of delayed operands. Tags are used to represent delayed storage operands which are in the process of being fetched or stored so that instructions using such operands can be partially processed using the tags in lieu of the operands. When an operand is fetched, its tag is broadcast to all register locations which might be awaiting any operand, and the fetched data is then gated on a common bus into only the registers at which the broadcast tag compared equal. The use of broadcast tags assured that fetches and stores also occurred in the proper sequence, even though their intermediate handling was out of sequence.

The subject invention does not use the tagging arrangement of U.S. Pat. No. 3,462,744 and does not use the stack arrangement found in U.S. Pat. No. 3,670,309.

The subject invention is an unobvious improvement on the prior arrangement used in the M168-III processor which enables a doubling in the machine cycle rate of processing stores in a PSCF.

SUMMARY OF THE INVENTION

It is a primary object of the subject invention to obtain a significant increase in the rate of handling processor store access requests, while they are being processed by a PSCF to transform their logical addresses to the absolute address form required to access main storage. The invention generally permits the instruction processing means to present a store request to the PSCF on every machine cycle, as long as the instruction processing means has store requests to present. Most store requests are in the PSCF for only two machine cycles, but some store requests may require dozens of machine cycles of processing in the PSCF.

It is another object of the subject invention to provide novel hardware control in a processor storage control function (PSCF) which can simultaneously process plural store requests out-of-sequence, but outgate the processed store requests to main storage in the same sequence in which they were provided by an instruction preprocessing unit (IPPF).

It is another object of the invention to provide for overlapping the processing of a plurality of store requests which also may be overlapped with the processing of a fetch request. The PSCF store request handling rate is not significantly affected by whether or not the store requests are represented in a processor store-through cache.

It is therefore another object of this invention to provide PSCF means for simultaneously and independently processing a plurality of store requests involving different and varying amounts of delay time, and yet have the PSCF means restore the received sequence of the store requests when they are outgated to main storage.

It is a further object of this invention to obtain a significant increase in the IPPF rate of outputting requests to the PSCF by allowing each IPPF operand address (OA) register to be released for receiving a next access request as soon as it outgates a request to the PSCF. The prior M168-III processor could not release an OA register until its outputted request had its processing completed in the PSCF and was outgated to main storage.

It is another object of the subject invention to enable any OA register in the IPPF to be serviced by any of plural STARs. This could not be done in the prior M168-III which permanently fixed a STAR to an OA register. This novel STAR connection flexibility provides a significant increase in the rate of handling store requests over the M168-III.

It is another object of this invention to eliminate the need for any release lines connecting from the outgate of a STAR back to a permanently assigned OA register in the IPPF.

It is a novel feature of the subject invention to respectively provide a plurality of redo registers in register sets which handle only store requests. Each register set comprises a redo register, STAR, F register, mark register, and merge register. By providing the redo registers within the register sets, and special counter means for controlling the operation of the register sets, they can handle delayed store requests simultaneously. The register sets in the prior M168-III system could not simultaneously handle delayed store requests, and they did not have counter control. This enables an increase in store request handling rates over the prior system, because plural delayed store requests can be received and simultaneously handled in an overlapped manner.

It is another feature of this invention to provide novel fetch to store sequencing control. A reject fetch signal is provided from the PSCF to the IPPF to prevent the IPPF from sending any fetch request while a store request is being handled by any redo register, although the IPPF can send further store requests as long as at least one register set is available. The fetch reject signal maintains the proper sequencing between stores and fetches by preventing a new fetch request from getting ahead of any prior store request being delayed in the PSCF. A busy trigger is provided with each redo register to indicate when it contains a valid request. A single redo request trigger services all redo busy triggers by making a request to a PSCF address bus whenever any redo register contained a request. Also different timing between the redo request trigger and the redo busy triggers aids in maintenance of the PSCF.

Another feature of the subject invention is a store counter in the PSCF to eliminate prior interlocks between the PSCF and the IPPF. A prime function of the store counter is to obtain independence between the IPPF OA registers and the PSCF store request register sets by signalling to the IPPF when the store request register sets are about to become full or when they have become full. This permits any OA register in the IPPF to transfer a store request to any non-busy register set in the PSCF. No fixed assignments are needed between the IPPF and PSCF registers.

Another feature of the store counter is to provide a simple means for controlling the execution of instruction serializaton (i.e. instruction requiring non-overlapped execution). Serializing instructions require that all processing be completed in the processor for the instruction immediately preceding a serializing instruction before execution can begin for the serializing instruction. Serializing instructions are defined on page 28 of the IBM System/370 Principles of Operation (Form No. GA22-7000-4). The store counter indicates to the IPPF when no store request is pending in the PSCF (e.g. all have been transferred to main storage), which is the last execution event needed to control the serialization of instructions, even though main storage may not yet have stored the data with the PSCF outputted store requests.

Another feature of the store counter is that it can provide a means for checking proper operation by the PSCF. By providing extra count capacity in the the store counter (i.e. counts in excess of one more than the number of store request register sets in the PSCF), the store counter may be monitored for checking purposes to determine if it ever contains a count value in excess of the number of register sets, in which case improper PSCF operation is indicated and a machine check interrupt signal is generated therefrom.

Another novel feature of this invention is an inpointer counter that sequences the store request register sets under control of store requests from the IPPF.

A further novel feature of this invention is a redo outpointer counter which controls which redo register will outgate its content to the PSCF bus at the end of the PSCF processing for the redo store request, when an absolute address (corresponding to a logical address in the redo register) is available in the PSCF.

A still further novel feature of this invention is a STAR output counter which is controlled in relation to the inpointer and outpointer counters to maintain the PSCF output sequence of store requests to main storage. The PSCF can output a store request after its absolute address is ingated into a STAR.

To summarize, this invention provides a unique hardware control arrangement for handling processor store requests comprising a store counter, an inpointer counter, an outpointer counter, a translator pointer register, and an output counter to control the sequencing of all store requests when received from the IPPF, while being processed by, and when outputted by the PSCF. The PSCF processing may delay a request; for example: (1) a store request is delayed by a DLAT miss because it must then await translation; or (2) although a store request translation, it may be further delayed because the translator is busy with a prior request, or (3) a store request has a DLAT hit and does not have any translation delay, but it may then be delayed by other events, such as awaiting the completion of translating a prior PSCF received store request; or (4) a store request may be delayed because it must access an address which is currently being accessed for a block fetch by a prior fetch request, or (5) a store request may be delayed by a combination of the preceeding delays in processing a sequence of store requests in the PSCF.

The store counter permits any store request register set in the PSCF to be selected by the inpointer counter to receive a store request sent by any IPPF OA register. The store counter is initially set to zero, and it is incremented by each store request accepted by the PSCF from the IPPF; and the store counter is decremented by each store request outputted by the PSCF to main storage.

The store counter generates a "no more store" signal when incremented to its highest legitimate count (equal to the number of register sets), which occurs whenever all of the register sets are busy. It generates a "one more store" signal when only one register set is available for a store request. The "one more store" and "no more store" signals are sent to the IPPF so it can control the sending of new requests to avoid ever over-running the store request register sets in the PSCF. Because of the turn-around time between the PSCF store counter operation and the IPPF response of holding up a request, the IPPF may slow the sending of store requests when it receives the "one more store" signal so that is is able to stop sending store requests to avoid register set overrun if it should receive a a "no more store" signal. Still further, counts above the "no more store" signal count are used to indicate a failure in the PSCF, and a machine check is then generated.

Furthermore, the store counter signals when none of the register sets are busy to indicate that there are no pending stores in the PSCF, so that the IPPF can use this signal for synchronizing the start of execution for a serializing instruction.

The inpointer counter, outpointer counter and outgate counter each have a number of counts equal to the number of store request register sets, and each wraparound from its highest to lowest numbered count. The inpointer counter, outpointer counter and output counter will generally be at different count settings during operation of the invention.

The inpointer counter selects the register set which will receive the next IPPF store request in either its STAR or redo register. The inpointer counter is incremented sequentially by each store request from the IPPF, in order to select the next register set which will handle the next IPPF store request. If an IPPF store request is not to be delayed in the PSCF, its absolute address is immediately (in a single machine cycle) found in the translation lookaside buffer (DLAT) and ingated by the PSCF bus into the STAR in the currently selected register set. But if a store request must be delayed in the PSCF, its logical address is ingated into the redo register in the currently selected set.

The redo outpointer counter operates separately from (although it is synchronized with) the inpointer counter and is used near the end of the PSCF delay period to select the register set containing a redo register making a redo request to transfer its contained store request to the STAR register in the same register set. Each redo request involves making a priority request for the PSCF bus, so that the redo register can input its store request to the PSCF bus. When a redo request is accepted, the outpointer counter is set to select the register set containing the accepted redo register. Then the logical address in the accepted redo register is outgated to the PSCF bus. If no further PSCF delay exists for that store request, it is gated to the DLAT, in which the absolute address is found and gated by the PSCF bus into the STAR in the selected register set. Then the STAR requests main storage priority; and when accepted, an output counter selects the STAR, and the absolute address for the request is transferred from the STAR to main store.

However, if any further PSCF delay exists for the accepted redo request (such as a prior store request being processed in the PSCF), that redo request (i.e. logical address inputted to the PSCF bus) is transferred back into the same redo register to await the further delay, and the redo register continues to make redo requests until its request is put into the STAR in absolute address form.

Whenever the translator receives a store request for translation, a translator pointer register receives the counter output which is selecting the register set assigned to the translator received store request. If the translator receives an IPPF store request, the inpointer counter is outputted to the translator pointer register. If the translator receives a redo request, the redo outpointer counter is outputted to the translator pointer register. If the translator receives a fetch request, no counter is ingated to the translator pointer register.

When the translator indicates its current translation is complete, it signals a priority request to the PSCF bus. When the translator store request is accepted, and no conflict exists between the store request and a block fetch, the outpointer counter is set to the pointer value in the translator pointer register, so that the outpointer then identifies the register set to receive the translation in its STAR when no further PSCF delay exists for the translator store request.

The output counter thus selects which register set will have its STAR next output a store request from the PSCF to main storage. When no STAR is busy, the output counter is set to the active inpointer or outpointer counter upon the PSCF bus acceptance of any store request. The output counter is incremented each time a STAR main storage accept signal is provided.

Special circuits therefore automatically adjust the settings of the redo outpointer counter and STAR output counter to the current, or a prior, inpointer or outpointer counter setting under different conditions, in order to obtain the required PSCF processing and outputting sequence control of store requests.

The subject invention can handle store requests in the fetch request handling environment described in U.S. Pat. No. 3,588,829 to Boland et al., which controls a block fetch in response to a cache miss by a fetch request.

The subject invention can output the PSCF processed fetch and store requests to a source/sink pushdown register chain providing main storage control for accessing interleaved modules, of the type described and claimed in U.S. Pat. No. 3,449,724 to Boland et al.

When not delayed in the PSCF, a store request takes two machine cycles to pass through the PSCF. About 99% of the store requests are expected to have DLAT hits, which therefore do not require translation and take only two cycles in the PSCF. The other 1% require translation which takes about 30 cycles per translation. When delayed, the delay in the PSCF can last for up to about 150 machine cycles. The worst case (which may seldom or never happen in practice) is where four successive store requests each require translation, i.e. four successive store requests in four different pages having no translation in the DLAT.

Other objects, features and advantages of the present invention will become more apparent in the light of the following detailed description of a preferred embodiment thereof, as illustrated in the drawings.

BRIEF DESCRIPTION OF THE DRAWINGS

FIGS. 1A, 1B, 1C, 1D, 1E and 1F illustrate a preferred processing storage control function (PSCF) embodiment of the subject invention.

FIGS. 3A, 3B, 3C and 3D provide detailed flow diagrams of the methods used by the hardware embodiment in FIGS. 1A–1F.

FIGS. 4 and 5 illustrate in more detail parts of the flow diagrams shown in FIG. 3C.

PREFERRED EMBODIMENT

Figure 1B:
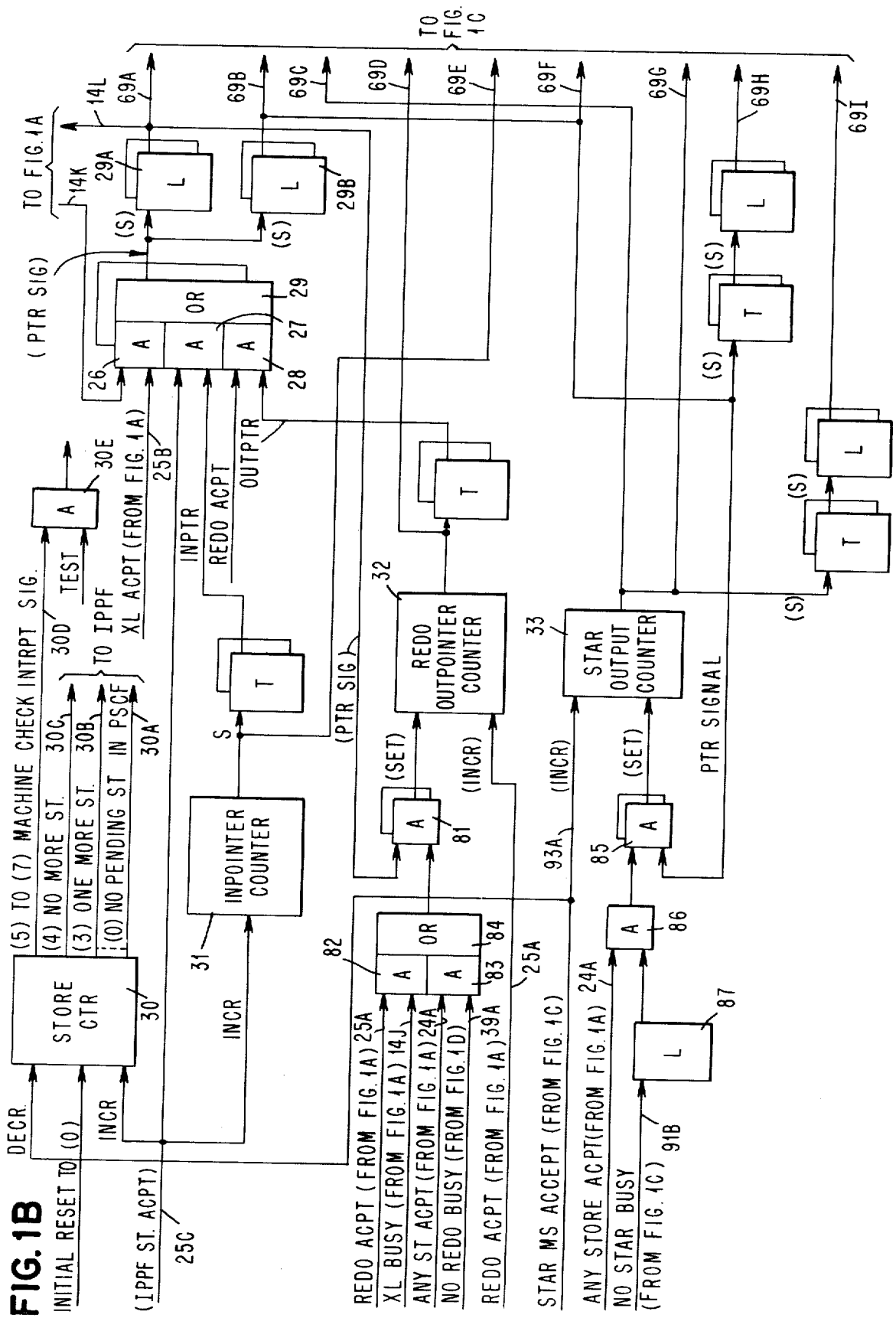

FIGS. 1A–1F illustrate pertinent parts of the circuitry in the processor storage control function (PSCF) containing the subject invention. FIG. 1G illustrates the pertinent circuitry in the instruction preprocessing function (IPPF) interfacing the PSCF circuitry in FIGS. 1A–1F. The store and fetch requests are provided from the IPPF in FIG. 1G on line 10 to line 10 in the PSCF in FIG. 1A. FIG. 1G illustrates the derivation of store and fetch requests from operand address registers OA1 through OAn in the IPPF. Fetch requests are also provided from the instruction fetch control in the IPPF. Each request is presented to PSCF priority circuit 11 in FIG. 1A where it may contend for PSCF bus priority with other storage requests being delayed in the PSCF previously supplied by bus 10 from the IPPF. Contending requests have their processing completed, or partly completed, in the PSCF and are being held by any or more of the four redo registers 16-1, 16-2, 16-3, or 16-4 shown in FIG. 1C or 1D, or in the translator (XL) pointer triggers 14A shown in FIG. 1A. A redo request signal is supplied on line 12, and a translator request signal is supplied on line 13 to PSCF priority circuit 11. Circuit 11 decides which received request is to be put on the PSCF bus by giving highest priority to a translator (XL) request on line 13, next higher priority to a redo store request line 12, and lowest priority to a new store or fetch request from the IPPF on line 10. The IPPF sends only one request at one time.

The request given priority is gated by circuit 11 to PSCF bus 21 comprising a PSCF control bus 21A and a PSCF address bus 21B. One of five triggers 22A, B, C, D, or E connected to control bus 21A is set in response to the accepted request which is given priority by circuit 11. The set trigger then sets a connected latch 23A, B, C, D, or E due to the trigger/latch type of circuitry which was used throughout this processor wherein alternate clock cycles will cause a signal first to be received by the trigger and then by the latch as the signal is propagated down a particular path in the processor. The set latch indicates whether a currently accepted request is from a redo register, translator store, IPPF store or fetch, and translator fetch, respectively.

An output from any of latches 23A, B, or C to an OR circuit 24 indicates the acceptance by the PSCF of any store request, i.e. redo accept, XL store accept, or IPPF store accept, which will indicate a store request address is on the PSCF address bus 21B and is ready for a next processing step in the PSCF.

A fetch request is also provided by the IPPF on bus 10. The fetch request is accepted for processing by the PSCF only if no store requests are delayed in the PSCF, but is rejected if there is a PSCF delayed store request. A PSCF store delay is indicated if any redo register is busy, or if the translator is busy with a store request, by means of AND gates 26A and 26B, respectively, which will provide an output through OR circuit 26C to generate a reject fetch signal on lin 26E which is provided to the IPPF to cause the fetch request to be sent again by the IPPF until it is accepted by the PSCF when it no longer has delayed stores.

Triggers 22A, B, C, D and E and latches 23A, B, C, D and E operate for one cycle and are reset automatically by the system clock within one cycle after they are set. While they are set, their set state is propagated to a receiving circuit before the latch is reset.

When PSCF priority circuit 11 accepts a request and activates its control bus 21A, the PSCF address bus 21B provides the logical address of the request to the PSCF address register 21C (triggers), which then transfers the request address to PSCF address latch 21D (latches). The output of address latch 21D supplies the address on bus 21E in FIG. 1C from which it is ingated into the logical address register (LAR) in the translator, or into the fetch address register (FAR) or into the STAR or redo register selected by the current setting of the in-pointer counter 31 via decoders 70A and 70B, respectively. However, only one of the ingated registers will be valid, and it is the register with its busy trigger set. The PSCF address bus is shown in more detail in FIG. 1F.

If it is a fetch request, the FAR busy trigger 36A is set in FIG. 1C by an output from OR circuit 18C in FIG. 1A due to a signal from AND gate 18A or 18B. Gate 18B provides a signal on the occurrence of a translator fetch accept on line 25E and a cache miss on line 8A. Gate 18A provides a signal on the occurrence of an IPPF fetch accept by latch 23D, if there is a cache miss on line 8A, and a DLAT hit on line 9C, provided there is not a reject fetch signal on line 26E caused by one or more store requests being delayed in the PSCF. When FAR is set busy, its contained request is outgated to request main storage priority in order to begin a block fetch transfer from main storage to cache 7.

Figure 1D:
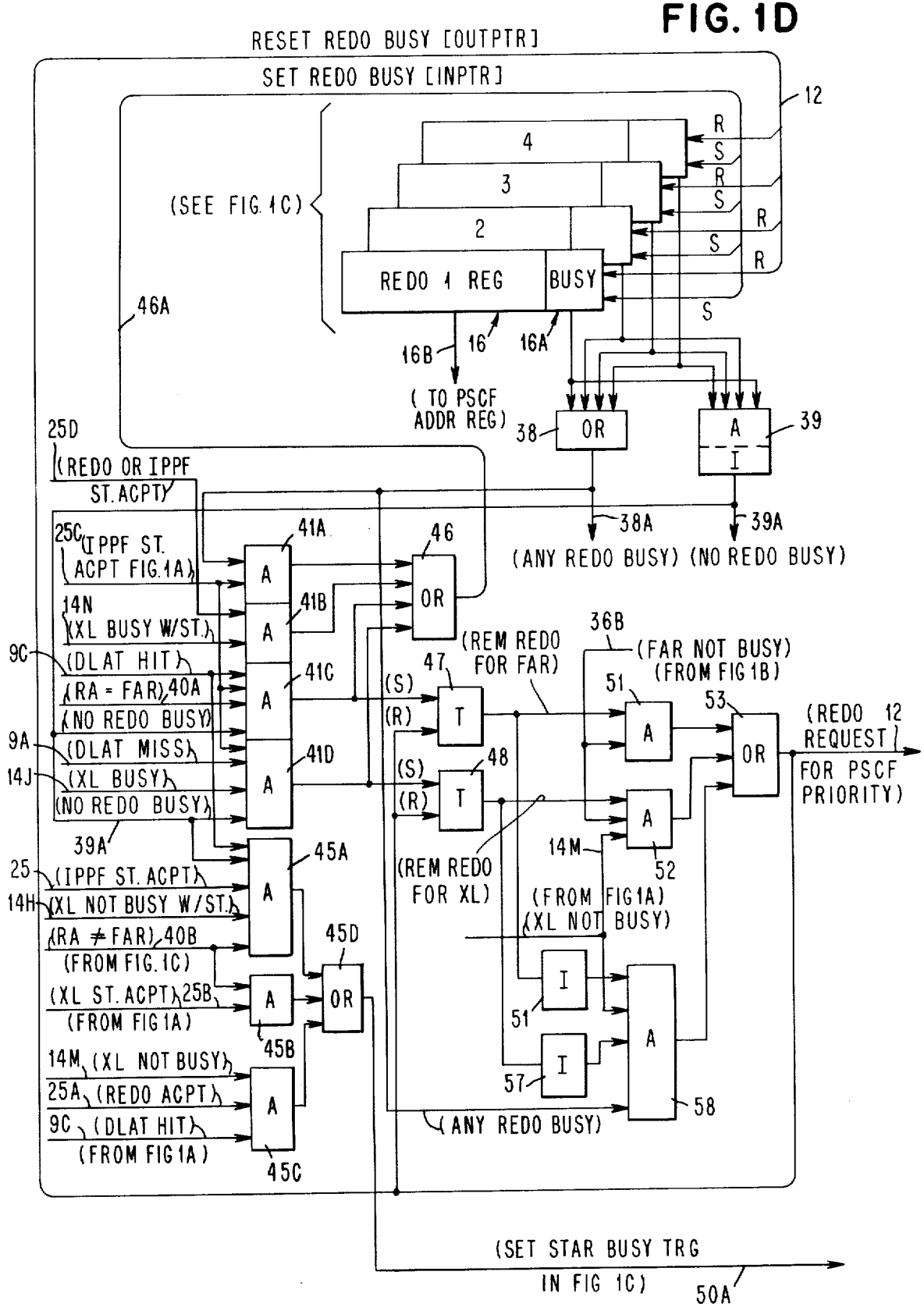

The STAR busy trigger will be set by a signal on line 50A from OR circuit 50 in FIG. 1D provided from AND gate 45A, B or C. AND gate 45A senses when an IPPF store request is accepted and is ingated into the STAR register; this is sensed by AND gate 45A when there is an IPPF store accept, a DLAT hit, no redo register busy, the translator is not busy with a store, and the store request absolute address from the DLAT is not equal to any pending fetch request in FAR.

AND gate 45B senses when the translator can output its result directly to a STAR; this is when a translator store request is accepted and the translator supplied absolute address is not equal to any current fetch request in FAR.

In more detail, a translator request is made whenever a translator operation is completed by the translator adder and controls 14E. When accepted, the address generated in TAR 14F is sent on line 14S to PSCF address register 21C and then to PSCF address latch 21D from which the address is ingated into the STAR and redo register currently selected by the translator pointer register 14A content passing through AND gate 26 in FIG. 1B. The PSCF address bus 21E also ingates the TAR address into FAR comparator 40 in FIG. 1C. If RA≠FAR line 40B is actuated, AND gate 45B in FIG. 1D is enabled which sets the selected STAR busy trigger, completing the reception of the absolute address into the selected STAR; and the selected redo register is ignored because its busy trigger is not set.

But if RA=FAR line 40B is actuated, a conflict exists between the store request and a current block fetch. Then no busy trigger is set, and the reception of the translated address into the selected STAR is delayed until the block fetch is completed; this is controlled by connecting the RA=FAR line 40A and FAR not busy line 36C back to the translator controls 14E to control the generation of the next translator request without disturbing the address in TAR 14F. Thus, the next request is inhibited by the RA=FAR signal on line 40A and occurs as soon as line 36C signals that FAR is not busy. The result is that the address in TAR is put into the selected STAR.

AND gate 45C senses when a redo accept signal can set the currently selected STAR busy trigger while it receives the DLAT hit signal and the translator not busy signal. OR circuit 45D provides the output of any AND gate 45A, B, or C to the set input of the currently selected STAR busy trigger.

The STAR busy triggers are reset by a STAR main store accept signal on line 93A from AND gate 93 which receives as its inputs a STAR request from OR circuit 91 which receives the set outputs from all STAR busy triggers, and the acceptance output from the main store priority circuit 92. The result will be that only the STAR register currently selected by the inpointer signal will be invalidated.

The request logical address in a redo register 16 is indicated by setting its busy trigger by means of line 46A which has its circuitry shown in detail in FIG. 1D. A signal is provided on line 46A through OR circuit 46 by means of any of AND gates 41A, B, C or D. These AND gates signal the conditions for the ingate validation of a redo register selected by the inpointer. AND gate 41D signals the condition of an IPPF store accept when there is a DLAT miss, the translator is busy, and there is no redo busy. AND gate 41C signals the condition of an IPPF store accept when there is no redo busy and there is a DLAT hit but the DLAT derived absolute address is the subject of a pending fetch request in FAR. AND gate 41B signals when a redo accept or IPPF store accept is provided while the translator is busy with a store request. AND gate 41A signals the condition when an IPPF request has been accepted but any redo register is busy as is indicated by a signal on the any redo busy line 38A. The currently selected redo register has its busy trigger reset to its non-busy state whenever it makes a redo request to the PSCF priority circuit 11. The redo outpointer counter selection of a requesting redo register remains until the requesting redo register is accepted by the PSCF priority circuit, which then increments the redo counter on line 25A.

FIG. 1D also shows the circuitry for generating a redo request for PSCF priority on line 12. A redo request is provided from OR circuit 53 to line 12 as soon as conditions exist for any redo outgating its content to the PSCF bus. These conditions do not exist when a redo busy trigger is set by either AND gate 41D or 41C because they are set when the translator is busy or the store request is being held up by the address interference of a pending fetch request in FAR. In these two cases, the fact that there will be a redo request as soon as the delaying condition ends is remembered in a trigger 47 or 48, respectively. Trigger 47 is set by the output of AND gate 41C, and trigger 48 is set by the output of AND gate 41D. The termination of the respective condition is indicated by operation of an AND gate 51 or 52. AND gate 51 is actuated by the set condition of trigger 47 and a FAR not busy signal which is provided when the FAR busy trigger is reset by a signal on line 36B.

AND gate 52 indicates the completion of translator delay by receiving a signal from trigger 48, a FAR not busy signal on line 36B, and a signal on line 14M indicating the translator is not busy which is provided when the translator completes its translator operation.

There are other conditions in which a store request is held up in a redo register only because a prior received store request has not yet been moved into a STAR from a redo register or the translator. These conditions are indicated by AND gates 41A and 41B. AND gate 41A indicates a delay in a redo register of a prior store request. AND gate 41B indicates a delay in the translator of a prior store request. However, these type of busy conditions will later generate a redo request for PSCF priority from an AND gate 58 which is activated when there are no remembered conditions in triggers 47 or 48, and any redo busy is being signalled from OR circuit 38, and the translator is not busy. This generates a signal on line 12 which requests PSCF priority and simultaneously resets the busy trigger to non-busy state. When the redo request is accepted and AND gate 45C (as previously explained) is activated, the content of the redo register is gated to the STAR in its register set. However, if the translator is busy with a prior store request for a prior selected register set, a later selected redo register may be accpeted, and again be ingated from the PSCF bus with its requesting address under control of gate 41B if the translator is still busy, but the outpointer counter (now incremented to another value) is set to its prior value to select the same redo register for ingating. The requesting redo register will then wait until the translator provides a "XL not busy" signal on line 14M to gate 45C, and then its accepted request will be outgated into the STAR in the same register set.

With each store request address entered into the STAR or redo register, there is accompanying data which is entered into the F register in the same register set, which also is currently selected by inpointer counter 31. The particular bytes in the double word of data stored in the corresponding F register are defined by the bit positions in the corresponding mark register 62 in the same set. That is, each mark register contains an eight bit byte in which each bit corresponds to a respectively positioned one of eight bytes in a double word in the associated F register. If a bit is set to 1, the corresponding byte in the F register was changed by the instruction processor execution unit, and if the bit is 0, the byte was not changed. Unchanged bytes may not necessarily exist in the F register but changed bytes must exist therein. The unchanged double word is obtained from either the cache, or main storage, and merged in a corresponding merge register 64 for cache unchanged bytes, or a main storage merge register (not shown) for main storage unchanged bytes. It is preferable to obtain the unchanged bytes from the cache if they are available therein, because of the faster operation of the cache, otherwise they are obtained from main storage.

One register set of F register 60, buffer mark register 61 and F mark register 62 is selected for ingating by decoder 70E and for outgating by decoder 70F or 70H. The merge register 64 in the same set is selected for ingating by decoder 70G and for outgating by decoder 70I.

Buffer merged control logic 63 accesses the double word in the cache, if available there at the address in the PSCF address register 21C, and logic 63 controls the merge in the selected merge register. The changed data in the F register is selected by logic 63 under control of the bits in the associated mark register 62, which inserts the changed bytes into a merged register 64 after it has received the unchanged double word from the cache in FIG. 1A. Thus, only the changed bytes are overlayed in the merge register by being transferred from the F register and selected by the current inpointer counter setting. A complete double word in its changed form is then put in the SDBI register for main storage. The changed bytes are directly put in the cache from F register 60 on lines 60A.

If the unchanged double word is not available in the cache, the F register content is transferred by control logic 63 to storage merge buffer (SMB1) which receives the marks in F mark register 62 (which contains the same mark bits as in register 61). SMB1 transfers its content to main storage which controls the merge.

U.S. Pat. No. 3,883,854 entitled "Interleaved Memory Control Signal And Data Handling Apparatus Using Pipelining Techniques" to Heinberg et al., filed Nov. 30, 1973, describes a pipeline merge in storage. U.S. Pat. No. 3,984,818 filed on Feb. 3, 1975 and entitled, "Paging in Hierarchical Memory Systems" uses a cache to assemble the changed bytes with the unchanged bytes when the word of data being addressed by a partial store operation is in the cache. This is done by interrogating the cache directory to see if the data is in the cache and, if it is, reading the data out of the cache into a register and thereafter using the marks to substitute the changed bits received from the processor. The memory words so assembled are then fed to the main memory and stored using a full store operation.

The operating speed of the cache is many times faster than main memory. Then, the only operation performed at the slower main memory speed is the full store operation. Thus, a partial store operation may be performed as fast as a full store operation if available in the cache. Synchronization of partial store operations between a processor and its channel or another processor is described and claimed in U.S.A. patent application Ser. No. 794,323 filed May 5, 1977 by P. M. Gannon et al. entitled "Technique For Performing Partial Stores in Store-Thru Memory Configuration" and assigned to the same assignee of the subject invention.

In FIG. 1B, the redo output pointer counter 32 is incremented by each redo accept signal. Counter 32 is set to a new value whenever AND gate 82 or 83 is activated. The AND gate 83 causes outpointer counter 32 to be set to the inpointer value in counter 31 whenever no redo register is busy when a store request is accepted by the PSCF priority circuit to synchronize the setting of the outpointer with the inpointer. AND gate 82 sets the outpointer value back to the old redo outpointer stored in latches 29A during the prior cycle if the translator is busy when a redo accept signal is provided.

In FIG. 1C, each time a request is ingated into a STAR, all PSCF processing is completed for the request, and the request is ready for transmission to main storage for accessing. Whenever a selected STAR is ingated, its busy trigger is set, which then provides the STAR busy signal through an OR circuit 91 which is inputted to a main store (MS) priority circuit 92 to request MS priority.

STAR output counter 33 controls which STAR is selected for transmission to the MS priority circuit 92. The outpointer counter selected STAR may not be the only STAR containing a MS priority request. Other STAR's may get inputs for later requests while the STAR selected by the output counter is awaiting MS priority for its earlier request. But, these later requests in STAR's must await their sequential selection by the output counter before they can request MS priority and outgate to main storage. This may happen when any STAR selected by the inpointer counter is ingated, and the STAR output counter 33 is one or more counts behind the input counter.

The STAR output counter 33 is synchronized with each PSCF request while no STAR is busy so that the first STAR to be ingated thereafter will be able to immediately make an MS priority request because the output counter will be pointing to it.

While no STAR is busy, the STAR output counter 33 is set to the value of the inpointer counter 31 or outpointer counter 32, or the translator pointer in triggers 14A, whichever is currently making a request for a transfer on the PSCF address bus 21. This output counter setting is done by means of an AND gate 85 which is receiving the currently active inpointer or outpointer or translator pointer signal from OR circuit 29 that is selecting the current register set. AND circuit 85 is activated by an AND gate 86 when it receives any store accept signal on line 24A from FIG. 1A, a no STAR busy signal stored in latch 87 by line 91B from inverter 91A in FIG. 1C. In this manner, the STAR output counter 33 is set to the active inpointer, or outpointer, or translator pointer.

Whenever main storage bus priority is given by circuit 92, a STAR main store accept signal is provided by AND gate 93 to line 93A in FIG. 1C. A signal on line 93A increments the STAR output counter 33 to its next sequential count, with count 1 following count 4.

The STAR main store accept also causes a selected merge register 64 and F marks (previously explained in regard to FIG. 1C) to be outgated to the SDBI register or storage mark bus (SMB) which sends the data to the main storage.

Figure 1F:
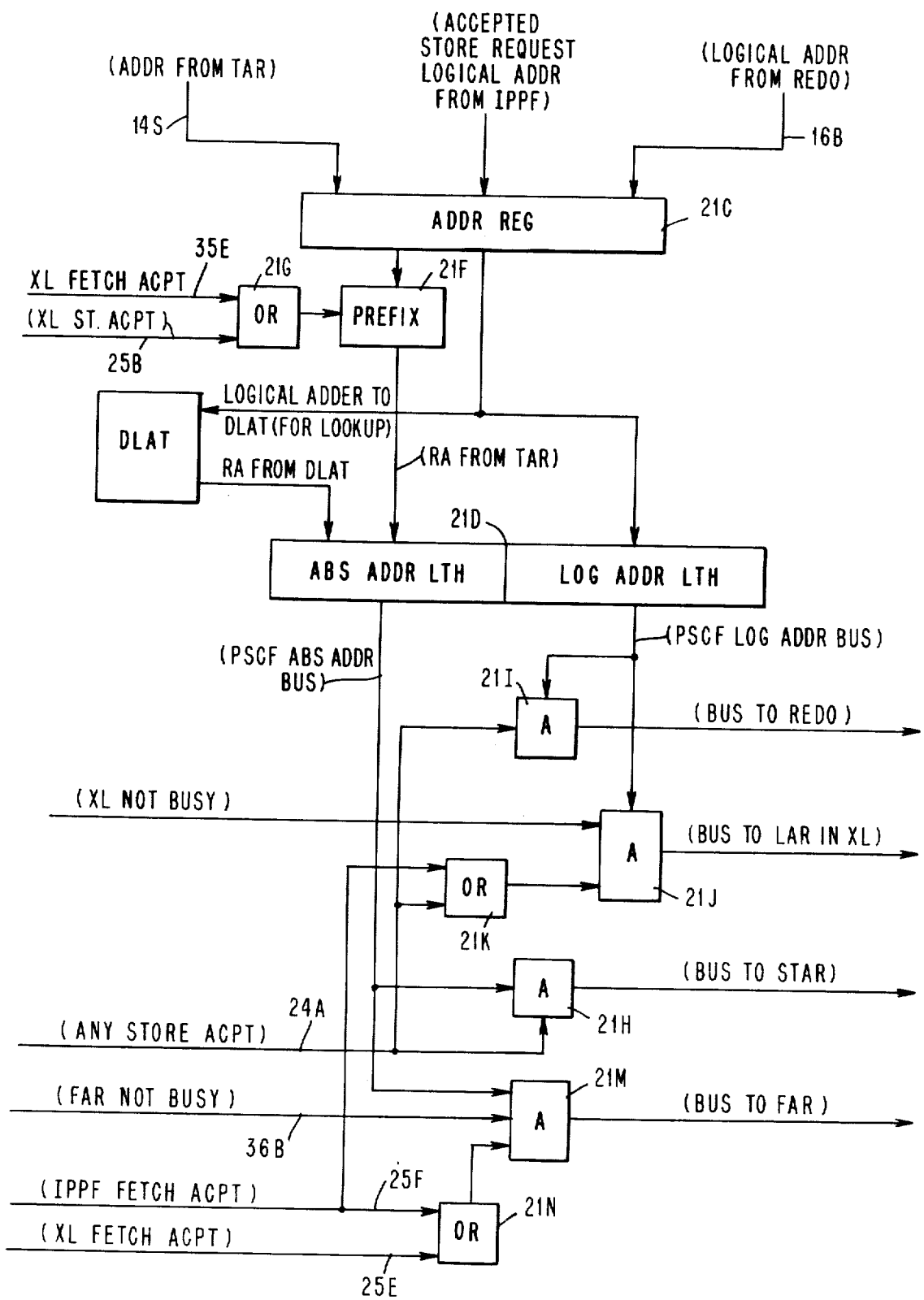
Figure 1G:
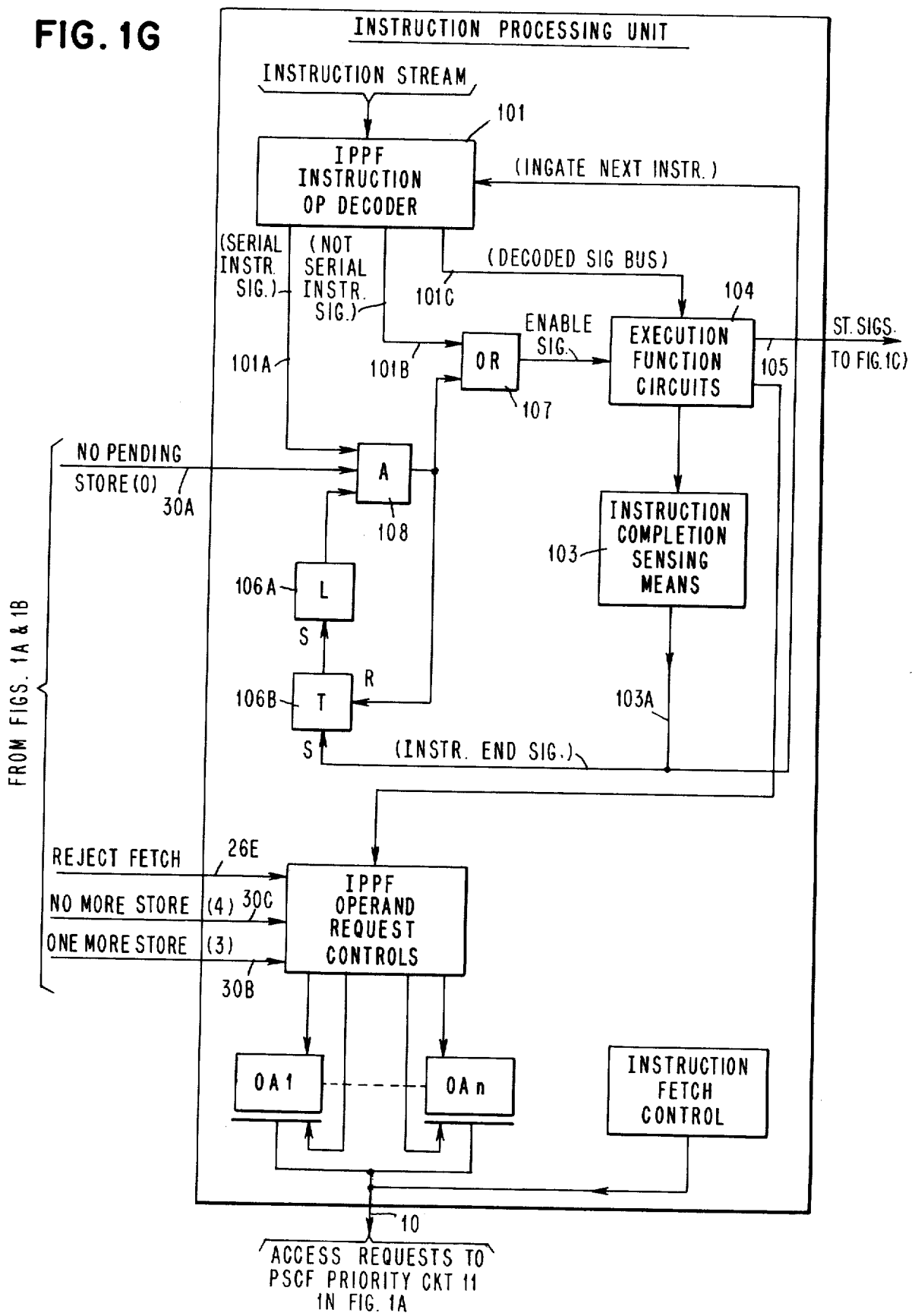
FIG. 1G illustrates a pertinent part of an instruction processing unit used with the preferred embodiment.

FIG. 1F illustrates the PSCF address bus in more detail than shown in FIGS. 1A and C. The address register 21C comprises bistable devices actuable at trigger clock time, and the address latch 21D comprises bistable devices actuatable at latch clock time, involving the previously explained trigger and latch signal propagation type circuitry. Thus, an address is received first by the address register 21C during trigger clock time, and then propagated to a selected part of the address latch 21D during latch clock time. The address register 21C can receive any of three inputs which are: (1) a logical address from the IPPF, a logical address from a redo register, or a real address from the translator address register (TAR) 14F in FIG. 1A.

Address latch 21D includes an absolute address part and a logical address part. An absolute address (RA) is obtained from the real address provided to register 21C from TAR by passing the real address through prefix circuits 21F to the absolute address part when gated by a translator fetch or store accept signal from OR circuit 21G. An absolute address (RA) from the DLAT is provided to the absolute address part in response to a DLAT hit when looking up in the DLAT a logical address supplied from address register 21C. A logical address in register 21C is transferred to the logical address part of register 21D.

A logical address in address latch 21D is outputted to either (1) the translator, or (2) a redo register selected by the inpointer counter. An absolute address in register 21D is provided to a STAR selected by the inpointer counter.

The conditions which outgate the PSCF address bus to a redo register, STAR, FAR or the translator are represented in FIG. 1F by AND gates 21I, 21H, 21M or 21J, respectively. Which of the STAR or redo registers is the valid recipient of an address transfer is controlled by AND gates 45A-C and 41A-D in FIG. 1D setting a busy trigger. Thus, a request address goes to the translator via AND gate 21J, which is gated by any accepted request if the translator is not busy. The translator is made busy if there is a DLAT miss.

The request address goes into both the STAR and redo register of the current inpointer selected register set if any store request is accepted. Only one of the two ingated registers will have its busy trigger set by either gates 41A-C or 45A-C, so that only one register will have a valid address. FAR is ingated if it is not busy and an IPPF or XL fetch request is accepted. But the FAR ingated address is valid only if its busy trigger is set by a signal from OR circuit 18C in FIG. 1A.

FIG. 1G illustrates pertinent interface lines between the PSCF and the instruction processing unit (comprising the IPPF and the execution (E) function). This interface indicates to the instruction processing unit when it can or cannot send fetch or store requests to the PSCF. Interface control is provided by store counter 30 in FIG. 1B which is initially reset to count (0) when the system is started up in order to predetermine that count (0) indicates there are no pending stores in the PSCF. Thereafter, during the operation of the PSCF, the store counter will be decremented to count (0) whenever there is no pending store in the PSCF. As long as store counter 30 is below count (4), the instruction processing unit can send store requests to the PSCF. Whenever the store counter is set to count (4) it sends a "no more store" signal to the instruction processor unit to indicate all store request register sets are busy so that no more store requests can be accommodated in the PSCF. It has been found in practice that the no more store signal is rarely activated because the four register sets are sufficient to permit the PSCF to handle a new store request on each machine cycle, except under rare conditions. Count (3) of the store counter generates a "one more store" signal on line 30C which is provided to indicate to the instruction processing unit that only one register set in the PSCF is not busy, and that the instruction processing unit should be prepared for the possibility that its next store request may fill all register sets. It should be realized that some register sets can be outgating requests to main storage concurrently with store requests being received from the instruction unit by other register sets. Therefore, at the same time a set may be made busy by a new store request, another set may be concurrently being made non-busy by transferring its request to main storage, and still another register set can be processing its request.

The store counter is incremented by each IPPF store request signal which is accepted and provided on line 25C from FIG. 1A. The store counter is decremented by each STAR main store accept signal on line 93A in FIG. 1B.

Thus, the decrementing will more or less keep up with the incrementing of store counter 30 so that it is below count (3) under normal conditions.

FLOW DIAGRAMS

Figure 2A:
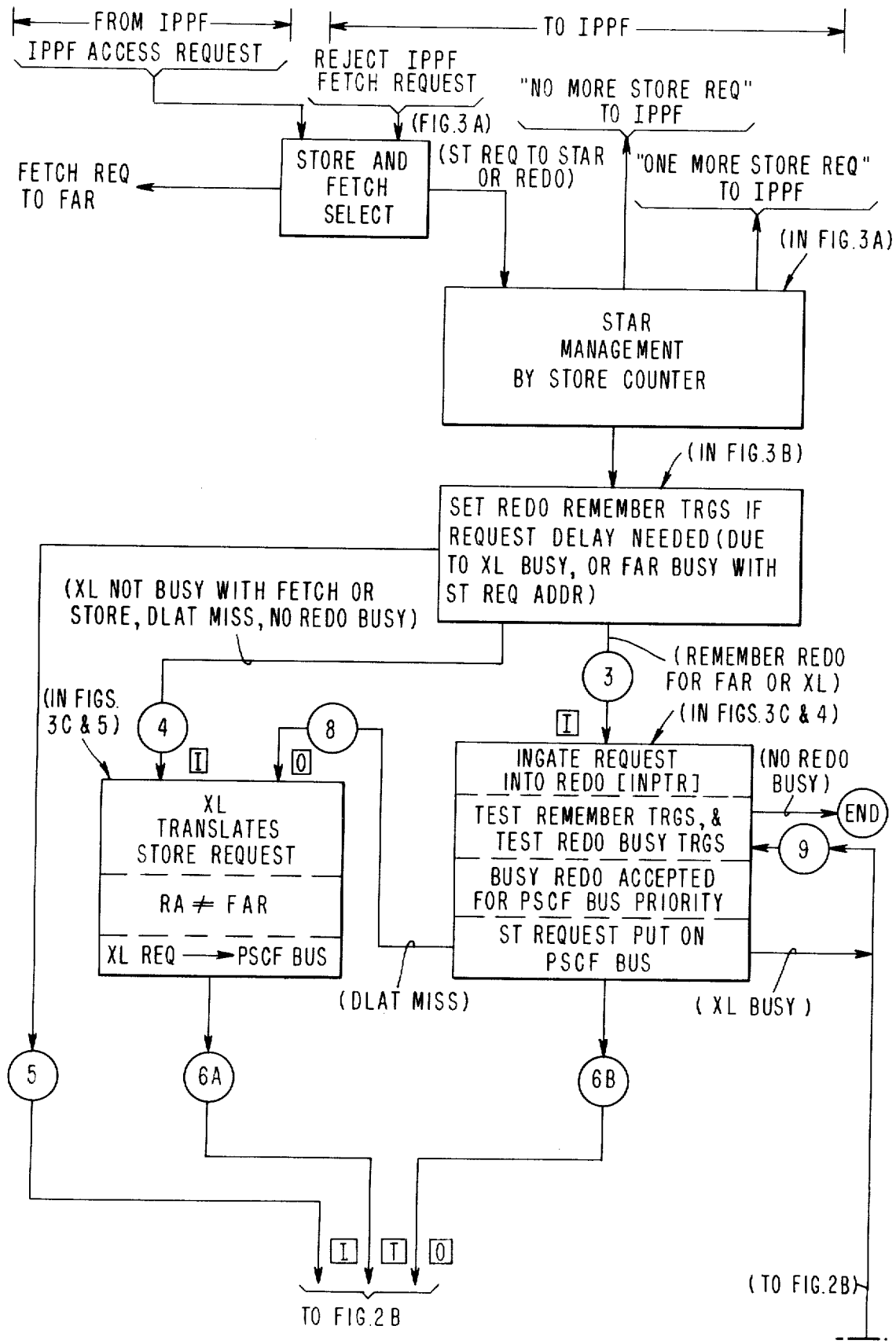
FIGS. 2A and 2B provide general flow diagrams of the methods and operations of the hardware in FIGS. 1A–1F.
Figure 2B:
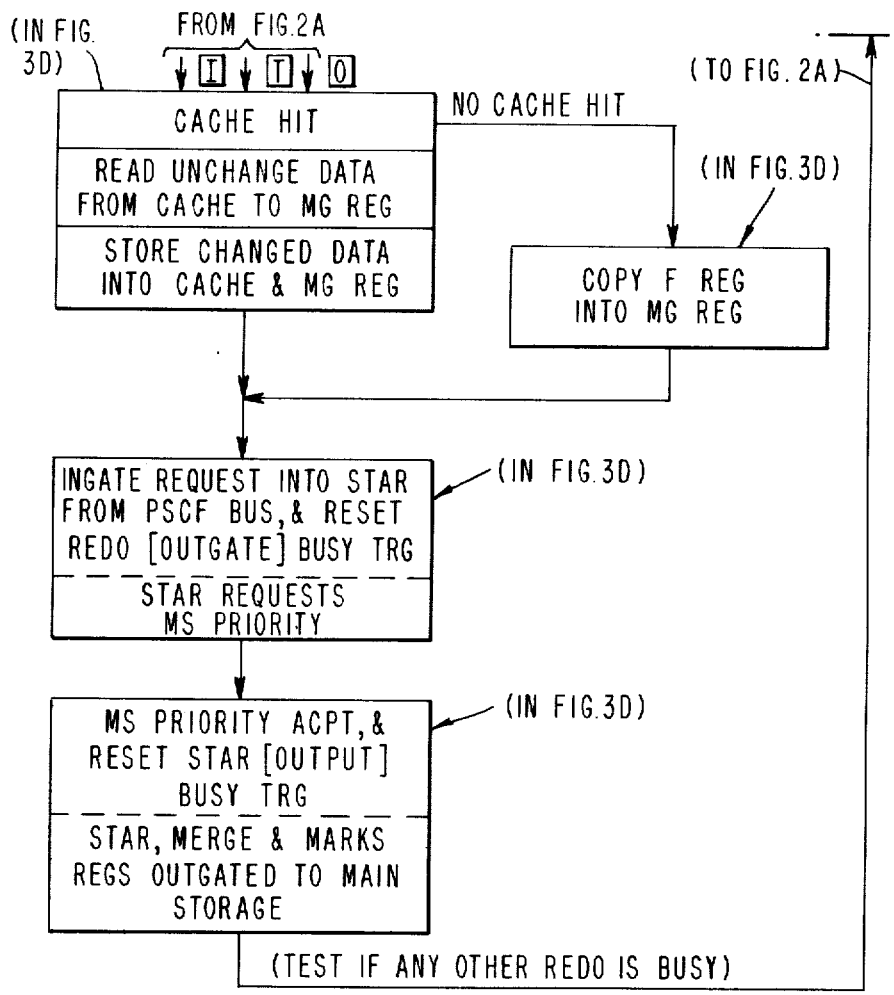
Figure 5:
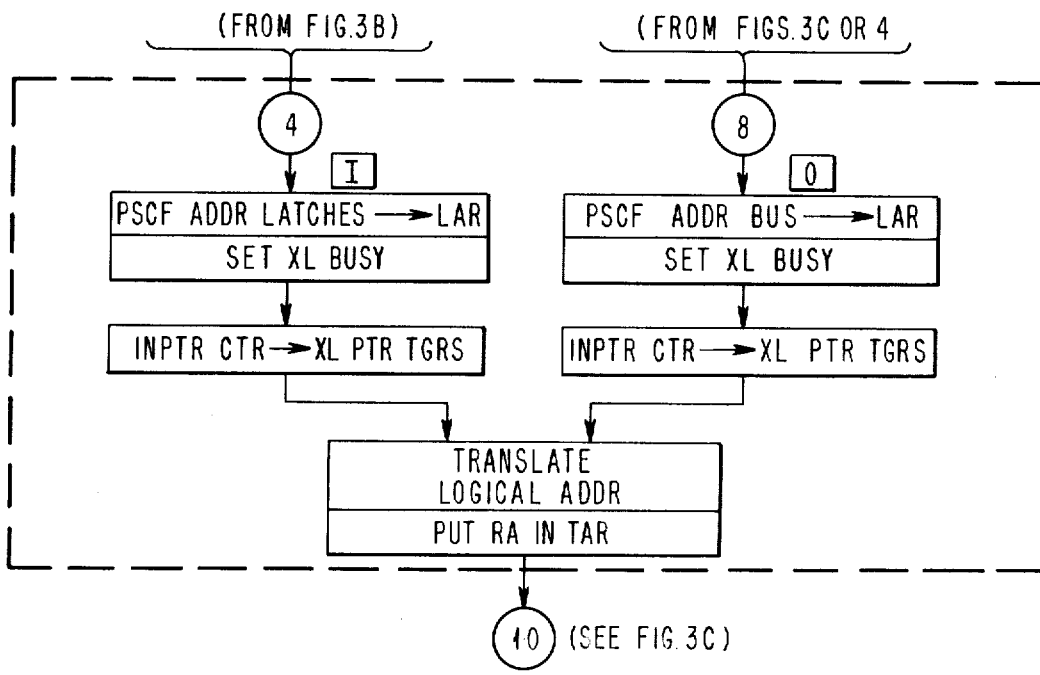
Figure 3A:
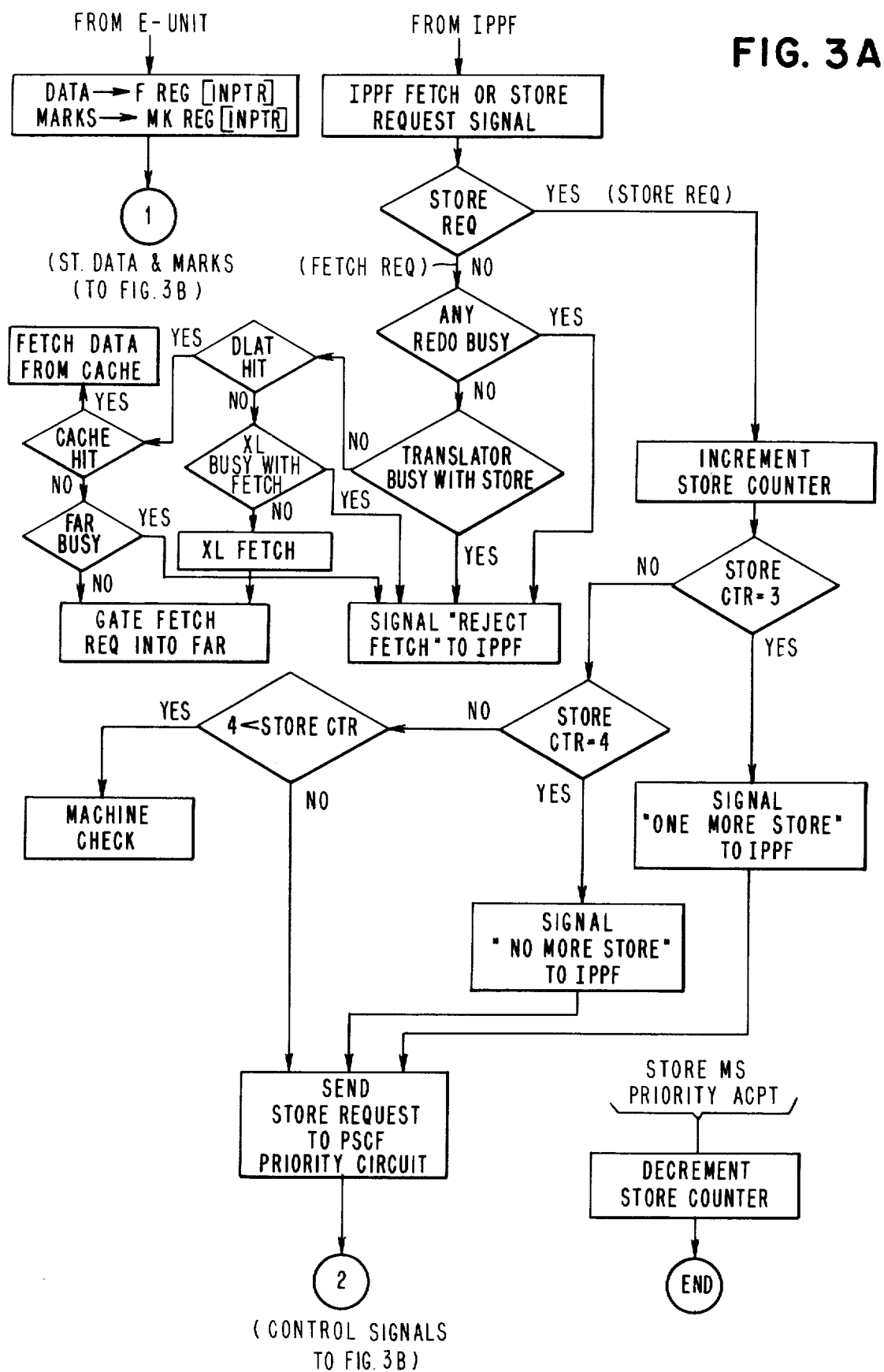
Figure 3C:
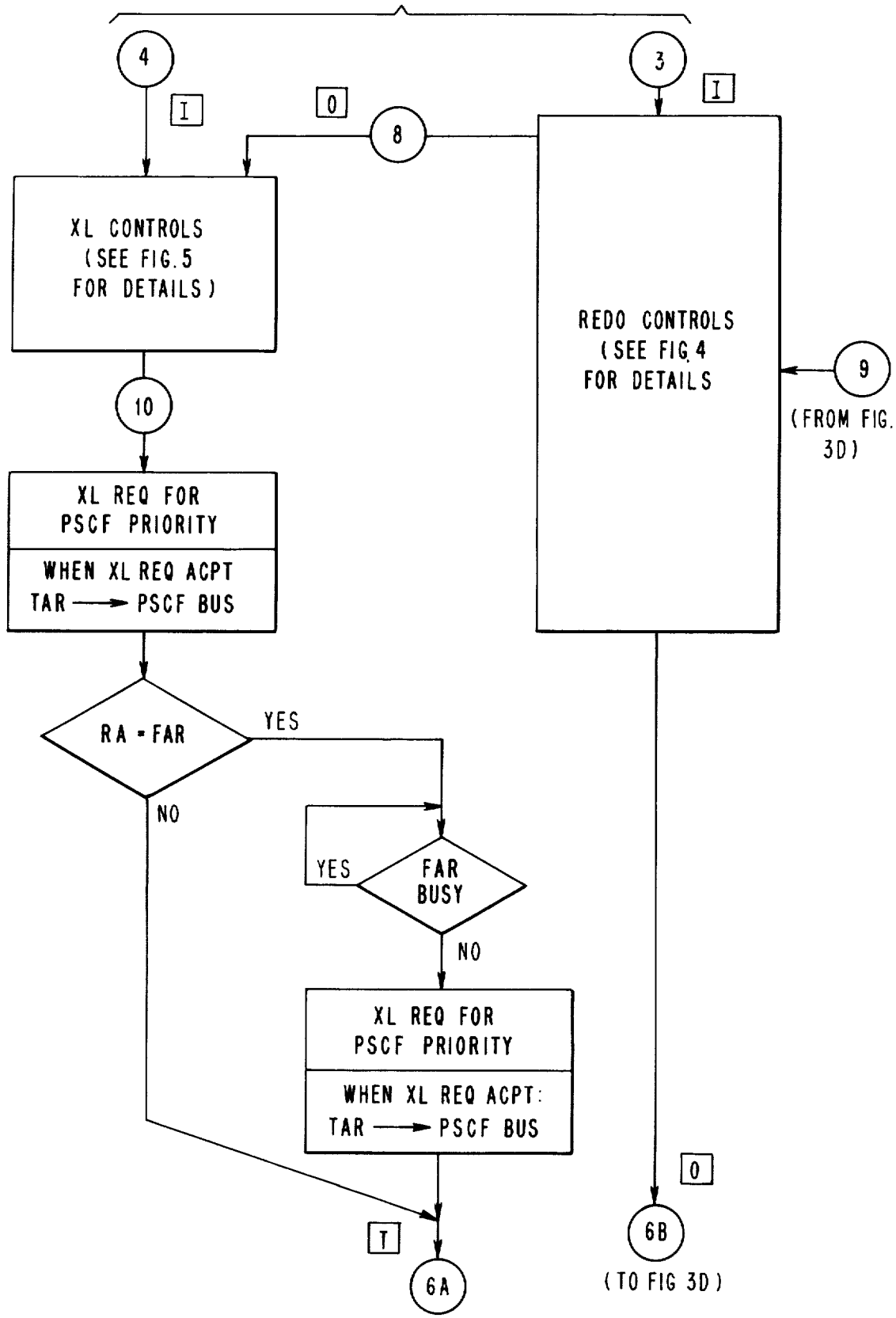

With the explanation previously given for the hardware arrangement in FIGS. 1A, B, C, D, the method of operation of this circuitry with its precise sequence of operation is shown generally in FIGS. 2A and B, and in a more detailed manner in FIGS. 3A through 3D, 4 and 5. The flow diagrams are self-explanatory.

CHECKING CIRCUITS IN THE PSCF

FIG. 1E illustrates a checking circuit provided with this invention to recognize that the STAR and redo registers in the same store request register set must never both be simultaneously busy. If they are, an error condition is indicated. One AND gate is provided in FIG. 1E per register set. Thus, the busy signal from the busy triggers of the STAR and redo register in each set is provided to the same AND gate in FIG. 1E. Outputs of the four AND gates are ORed together to a machine check interrupt signal line, so that if the prohibited condition ever happens in any register set, a machine check interrupt is generated.

Another type of checking function is done by the store counter 30 in FIG. 1B above and beyond its interface functions. A machine error condition is indicated if ever store counter 30 exceeds count (4) (which activates the "no more store" signal on line 30C in FIG. 1B). Store counter 30 is therefor provided with excess counting capacity above (4). In this embodiment, counter 30 is a three bit counter providing eight counts, and any count exceeding (4), i.e. counts (5), (6), (7), activate a machine check interrupt signal line 30D. The state of line 30D is tested by AND gate 30E either automatically by means of an instruction, or manually from the system console to determine if a machine check interrupt should be generated.

SERIALIZED INSTRUCTION START CONTROL

The instruction processing unit in FIG. 1G contains the prior art circuits which perform the I-unit and E-unit functions including IPPF instruction decoder circuits 101, and instruction completion sensing means 103 which detects when all I-unit and E-unit functions are completed for a current instruction. A problem exists for certain types of instructions called serializing instructions which cannot be overlapped in their execution with any prior instruction since its operation might adversely effect any uncompleted execution for the prior instruction. There are a relatively large number of serializing instructions, which are defined in the IBM System/370 Principles of Operation (Form No. GA22-7000-4) on page 28.

FIG. 1G includes an embodiment for controlling instruction serialization. It utilizes all of the circuitry previously described in relation to FIGS. 1A-1F. In FIG. 1G, the instruction OP decoder 101 receives a stream of instructions comprising any program in execution. Decoder 101 decodes each instruction and indicates from the operation code of the instruction whether or not it is a serializing instruction by signals on line 101A or 101B. One of its outputs is provided on decoded signal bus line 101C to execution function circuits 104.

Instruction completion sensing means 103 comprises conventional circuits which use signals from the execution function circuits 104 to indicate when all processing is completed for each instruction currently being executed in the instruction processing unit. For example, the conventional instruction end signal may control the next instruction address in the instruction counter and program status word in circuits 104. The instruction end signal is provided on line 103A, and it indicates that the instruction processing unit has nothing further to do in regard to execution of the current instruction. Line 103A is therefore provided to the instruction OP decoder 101 to cause it to outgate the next instruction for execution.

A non-serializing instruction being decoded is indicated by a signal on line 101B which is provided through an OR circuit 107 to enable the conventional operation of execution function circuits 104 to permit execution to continue in the normal way.

If a serializing instruction is being decoded, in decoder 101, a serializing instruction signal is provided on line 101A, and no signal is provided on line 101B. The execution function circuits 104 will not then receive any enabling signal from OR circuit 107. Execution cannot proceed for the decoded serializing instruction until OR circuit 107 provides an enable signal. The enable signal for serializing instructions is controlled by AND gate 108, which receives inputs from line 101A, store counter line 30A from the PSCF, and a latch 106A which stores the instruction end signal until its trigger 106B is reset. After line 101A indicates a serializing instruction is being decoded, and latch 106A indicates the instruction processing unit has ended its execution of the last instruction, AND gate 108 may still be disabled by store counter 30 in FIG. 1B not having reached the count (0) state indicating store requests are still being processed in the PSCF for the last instructions. AND gate 108 will not provide an enable signal through OR circuit 107 until the PSCF reaches a zero store (0) count for the last instruction, so that execution cannot begin for the serializing instruction in decoder circuit 101. When all store requests have left the PSCF for main storage, count (0) is reached, and AND gate 108 then will provide an enable signal through OR circuit 107 to enable the execution function circuits 104 to begin execution of the serializing instruction in decoder 101.

In more detail, each time a storage request is outputted from the PSCF to main storage for the prior instruction, the store counter 30 is decremented, and it reaches count (0) when no store request remains in the PSCF.

In this manner, storage requests in the PSCF for the last instruction can be synchronized with the decoding of a serializing instruction.

But if the next instruction is not a serializing type, the execution function circuits 104 will never be disabled and may overlap the execution of the last instruction with the next instruction, and their store requests also may be overlapped in the PSCF circuits of FIGS. 1A–1F.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A storage control means in a processor for handling multiple and overlappable requests for accessing a random access main storage during the occurrence of sequence disrupting events, the storage control means receiving fetch and store requests from an instruction processing means and providing an output sequence of the fetch and store requests to main storage having the same sequence as the requests were received from the instruction processing means, the storage control means comprising plural store request register sets for receiving the store requests from the instruction processing means, each set including a store address register and a redo register, the STAR being provided for receiving a store request, and the redo register being provided for receiving a delayed store request, delay means for transmitting to a selected redo register means for transmittinng to a selected redo register storage requests which were delayed in processing in the storage control means, means responsive to the delay means for activating the use of the redo registers to receive the delayed store requests.

counter means for selecting a register set for receiving a store request provided by the instruction processing means, the counter means selecting a redo register in one of the sets for receiving a store request provided by the delay means within the storage control means, and means responsive to the delay means for activating the use of the redo registers to receive the delayed store requests.

2. A storage control means as defined in claim 1, further comprising means for sensing when a store request will be delayed in the storage control means, means for transferring an address for a store request into the redo register of the register set selected by the counter means when the sensing means senses that the store request will be delayed, and means for loading an address for the store request from the redo register into the STAR of the register set selected by the counter means when the sensing means senses that the store request will not be delayed, whereby the instruction processing means considers the store request to be completed when the store request is received by either a STAR or redo register.

3. A storage control means as defined in claim 2, further comprising a fetch address register (FAR) for receiving each fetch request from the instruction processing means, redo busy means for signalling a busy or non-busy state for each redo register, the busy state for a respective redo register indicating the respective register which contains a valid store request, and fetch request reject means connected to the redo busy means for signalling to the instruction processing means a rejection of a current fetch request when any redo busy means signals a busy state, whereby fetch requests are accepted for processing by the storage control means only when no redo register is in a busy state.

4. A storage control means as defined in claim 3, further comprising means for ingating into the STAR in the register set selected by the counter means an absolute address for the store request when the sensing means indicates no delay or no further delay, the absolute address being obtained from a translation lookaside buffer (DLAT) in correspondence with a logical address for the store request provided by the instruction processing means, and the absolute address not being involved in any current block transfer from the main storage to a cache, and STAR busy means for signalling a busy state for each STAR receiving an absolute address from the STAR ingating means.

5. A storage control means as defined in claim 4, further comprising means for ingating into the redo register in the register set selected by the counter means a logical address for the store request received from the instruction processing means when the sensing means indicates a delay in the storage control means.

6. A storage control means as defined in claim 2, further comprising an input bus of the storage control means for receiving store requests from the instruction processing means, the input bus also receiving store requests internal to the storage control means, the input bus being connected to the STAR and redo registers in the plural register sets, an input bus priority circuit for determining which received request is to be propagated on the input bus, and the counter means selecting one of the plural register sets for receiving the store request on the input bus.

7. A storage control means as defined in claim 6, further comprising the input bus priority circuit generating an IPPF store accept signal upon accepting a store request from the instruction processing means, means for generating an any redo busy signal when any redo register contains a valid store request address, ANDing means receiving the any redo busy signal and the IPPF store accept signal, means for connecting an output of the ANDing means to redo busy triggers associated with the redo registers, the counter means selecting one of the register sets to enable the redo busy trigger in the selected register set to be set by the output of the ANDing means.

8. A storage control means as defined in claim 6, further comprising the input bus priority circuit generating an IPPF store accept signal upon accepting a store request from the instruction processing means, or providing a redo accept signal upon accepting a store request from one of the redo registers, logical-to-real address translator means providing a busy with store request signal indicating when the translator means is translating a store request, ANDing means receiving the translator busy with store signals and the redo accept or IPPF store signal, and means connecting an output of the ANDing means with redo busy triggers associated with the redo registers, one of the register sets selected by a setting of the counter means to enable the redo busy trigger in the selected register set to be set by the output of the ANDing means.

9. A storage control means as defined in claim 6, further comprising the input bus priority circuit generating an IPPF store accept signal upon accepting an IPPF store request from the instruction processing means, DLAT means for receiving a logical address and looking up any corresponding absolute address in the DLAT means to provide a DLAT hit signal if found or a DLAT miss signal if not found, comparator means for comparing an absolute address for the store request with an address in a fetch address register having a current fetch request to provide an equal or unequal signal, means for generating a no redo busy signal when no redo register is busy, ANDing means receiving the IPPF store accept signal, the DLAT hit signal, the equal signal from the comparator means, and the no redo busy signal, means connecting an output of the ANDing means with redo busy triggers associated with the redo registers, one of the register sets selected by a setting of the counter means to enable the redo busy trigger in the selected register set to be set by the output of the ANDing means.

10. A storage control means as defined in claim 9, further comprising a bistable device being set by the output of the ANDing means, an AND circuit having an input receiving the output of the bistable device, a FAR busy trigger associated with a fetch address register (FAR) in the storage control means, the busy trigger having an output connected to another input of the AND circuit to indicate when FAR is not busy, the output of the AND circuit providing a redo request signal when a delay is ended which is caused by a store request conflict with a current fetch request.

11. A storage control means as defined in claim 6, further comprising the input bus priority circuit generating an IPPF store accept signal upon accepting an IPPF store request from the instruction processing means, DLAT means for receiving a logical address and looking up any corresponding absolute address in the DLAT means to provide a DLAT hit signal if found and a DLAT miss signal if not found, logical-to-real address translator means providing a translator busy signal when translating any storage access request logical address, and providing a translator not busy signal when not doing a translating operation, means for generating a no redo busy signal when no redo register is busy, ANDing means for receiving the IPPF store accept signal, the DLAT miss signal, the translator busy signal, and no redo busy signal, means connecting an output of the ANDing means with redo busy triggers associated with the redo registers, one of the register sets selected by a setting of the counter means to enable the redo busy trigger in the selected register set to be set by the output of the ANDing means.

12. A storage control means as defined in claim 10, further comprising a bistable device being set by the output of the ANDing means, an AND circuit having an input receiving the output of the bistable device, the translator not busy signal being connected to another input of the AND circuit, a FAR busy trigger associated with a fetch address register (FAR) in the storage control means, the FAR busy trigger having an output connected to still another input of the AND circuit to indicate when FAR is not busy, the output of the AND circuit providing a redo request signal when a delay is ended which is caused by the translator.

13. A storage control means as defined in claim 7, further comprising a first bistable means being set by the sensing means when a store request delay is being caused by a conflict between the store request and a current fetch request in a fetch request register (FAR), a second bistable means being set by the sensing means when a store request delay is being caused by waiting for a translator operation to complete, AND circuit means having inputs receiving complementary outputs of the first and second bistable means, a translator not busy signal being connected to another input of the AND circuit means, and an any redo busy signal being connected to still another input of the AND circuit means, the output of the AND circuit means providing a redo request signal to the input bus priority circuit.

14. A storage control means as defined in claim 6, further comprising

DLAT means for generating a DLAT hit signal when an absolute address for a current request is found in the DLAT, means for generating a no redo busy signal when no redo register is busy, The storage control priority circuit providing an IPPF store accept signal upon accepting a store request from the instruction processing means, logical-to-real address translator means providing a translator not busy with store signal when the translator means is not translating a store request, comparator means for comparing the absolute address for the store request with any current address in a fetch address register to provide an equal or an unequal signal, ANDing means having inputs receiving the DLAT hit signal, the no redo busy signal, the IPPF store accept signal, the translator not busy with store signal, and the not equal signal from the comparator means, means for connecting an output of the ANDing means with STAR busy triggers associated with the STARs in the register sets, the counter means selecting one of the register sets to enable the STAR busy trigger in the selected register set to be set by the output of the ANDing means.

15. A storage control means as defined in claim 6, further comprising the input bus priority circuit providing a translator store accept signal upon accepting a store request from the translator upon completion of translation of a store request logical address, comparator means for comparing an absolute address for the store request with an address in a fetch address register for a current fetch request to provide an equal or unequal signal, ANDing means receiving the unequal signal from the comparator means and the translator store accept signal, and means for connecting an output of the ANDing means with STAR busy triggers associated with the STARs in the register sets, the counter means selecting one of the register sets to enable the STAR trigger in the selected register set to be set by the output of the ANDing means.

16. A storage control means as defined in claim 6, further comprising logical-to-real address translator means providing a translator not busy signal when the translator is not busy, the input bus priority circuit providing a redo accept signal upon accepting a store request from any redo register, DLAT means for providing a DLAT hit signal when an absolute address for the store request is found in the DLAT means, ANDing means having inputs receiving the translator not busy signal, the redo accept signal, and the DLAT hit signal, means for connecting an output of the ANDing means with STAR busy triggers associated with the STARs in the register sets, the counter means selecting one of the register sets to enable the STAR busy trigger in the selected register set to be set by the output of the ANDing means.

17. A storage control means as defined in claim 4, further comprising the sensing means including means for comparing the absolute address obtained from a translation lookaside buffer (DLAT) with the address in FAR, and signalling a delay if the FAR and DLAT addresses are equal, and means for retransferring back into the redo register in the selected set the logical address of the redo register in response to a continuance of delay signalling for another redo register.

18. A storage control means as defined in claim 17, further comprising an input bus of the storage control means for receiving store and fetch requests from the instruction processing means, the input bus also receiving store requests internal to the storage control means, the input bus being connected to the STAR and redo registers in the plural register sets, an input bus priority circuit selecting which store request is accepted by the input bus, inpointer counter means being incremented by each store request received from the instruction processing means in a predetermined wrap-around count sequence, means connecting the output of the inpointer counter means to select one of the store request register sets for ingating a store request address in the STAR or redo register in the selected register set, and redo outpointer counter means for selecting the register set which contains the redo register making a redo request to the input bus for changing the location of the store request from the redo register to the STAR in the same register set when the sensing means indicates the absolute address for the store request is available in a DLAT means for transfer to the STAR, and means for incrementing the redo output counter with each redo accept signal.

19. A storage control means as defined in claim 18, further comprising

AND circuit means for setting the redo outpointer counter means to the state of a currently active pointer when no redo register is busy and any store request is accepted by the input bus.

20. A storage control means as defined in claim 18, further comprising means for setting the redo outpointer counter means to a prior count setting, AND circuit means having as inputs a redo accept signal and a translator busy signal, means connecting the output of the AND circuit means to the setting means for actuating the setting means when the AND circuit means is actuated in order to set the prior count into the redo outpointer counter means.

21. A storage control means as defined in claim 18, further comprising a first AND gate means for selecting one of the plrual registers sets, the first AND gate means having one input receiving a translator accept signal from the input bus priority circuit indicating a translator output is connectable to the input bus for transfer to a selected register set, the first AND gate means having another input receiving a pointer currently stored in the translator for selecting the register set to which the input bus is connected for receiving the translator output.

22. A storage control means as defined in claim 18, further comprising a second AND gate means having an input for receiving a store request from the instruction processing means, and means for connecting the output of the inpointer counter means to another input of the second AND gate means, and bistable means connecting the output of the second AND gate means to the register sets for selecting the register set to receive the store request from the instruction processing means.

23. A storage control means as defined in claim 18, further comprising a third AND gate means having an input for receiving a redo accept signal indicating a redo store request is being provided on the input bus, means connecting the output of the redo outpointer counter to another input of the third AND gate means, and means for connecting the output of the third AND gate means for selecting the register set for receiving the redo store requrest provided on the input bus.

24. A storage control means as defined in claim 18, further comprising output counter means for controlling the outputting of the STARs in a predetermined sequence to system main storage as each STAR busy trigger is set to a busy state.

25. A storage control means as defined in claim 21, further comprising means for generating a no STAR busy signal when no STAR is busy, means for setting the content of the output counter means to the pointer value currently being provided by the inpointer counter means, the outpointer counter means or a translator upon any store acceptance by the input bus, and means for incrementing the output counter means upon the setting of each STAR busy trigger.

26. A storage control means as defined in claim 18, further comprising, a store counter, means for incrementing the store counter in response to each store request from the instruction processing means, means for decrementing the store counter in response to each outputting of a STAR by the STAR outputting means, and means for signalling no more store requests to the instruction processing means when the store counter is incremented to a count equal to the number of sets, whereby the no more store signal indicates all sets are currently filled with valid requests.

27. A storage control means as defined in claim 26, further comprising means for initially resetting the store counter to a zero count to indicate no set contains a valid store request, whereby all sets are available to receive store requests.

28. A storage control means as defined in claim 27, further comprising means for sensing a state of the store counter at a count equal to one less than the number of sets, and means for signalling one more store to the instruction processing means to warn that currently only one set is available to receive a store request.

29. A storage control means as defined in claim 26, further including a storage control checking means connected to the output of the store counter, the checking means sensing storage control counts, and means for testing the count state of the checking means to provide a machine check interrupt signal if the count state exceeds one more than the number of sets.

30. A storage control means as defined in claim 4, further including

STAR-redo register checking means comprising a plurality of AND gates, each AND gate receiving paired outputs from the redo busy means and the STAR busy means in the same set, and the AND gates each receiving paired outputs from a different set in the storage control means.

31. A storage control means as defined in claim 27, further providing means for controlling the start of execution of serializing instructions, including instruction execution means in the instruction processing means for sensing the completion of execution of an instruction by the instruction processing means, means for transferring a zero count state by the store counter to the instruction processing means, and means for detecting the simultaneous occurrence of the completion of execution sensed by the instruction execution means and the zero count state of the store counter by the transferring means to signal to the instruction processing means the existence of conditions for beginning execution of a serializing instruction.

32. A storage control means in a processor for handling multiple and overlappable store requests for accessing main storage during the occurrence of sequence disrupting events, the storage control means receiving fetch and store requests from an instruction processing means and providing an output sequence of processor storage fetch and store requests to main storage having the same sequence as the requests are received from the instruction processing means in the processor, the storage control means comprising a plurality of store request register sets for receiving the store requests from the instruction processing means, each set including at least a storage address register (STAR) and a redo register;

inpointer counter means for selecting each next register set in a predetermined sequence, means for incrementing the inpointer counter means with each store request accepted from the instruction processing unit, a fetch address register (FAR) for receiving each fetch request accepted from the instruction processing means, means for sensing whether or not a store request will be delayed in the storage control system, means for loading an address for a store request from the instruction processing means into the redo register or STAR of the register set currently selected by the input counter means according to whether the sensing means senses that the store request will be delayed or not delayed, respectively, by processing in the storage control means, means for transferring a store request from the redo register to the STAR in the same register set when the sensing means indicates the delay is completed for the store request in that register set, and means for sequentially outgating the same sequence of store requests to main storage as received by the STARs as main storage indicates it is ready to make corresponding storage accesses.

33. A storage control means as defined in claim 32, in which the sensing means further comprises means for detecting whether a translated address for a store request is in translation lookaside buffers (DLATs), a DLAT miss signal provided when the translated address is not in the DLATs, and a DLAT hit signal being provided when the translated address is in the DLATs, translator means for receiving a store request from the redo or instruction processing means in response to the DLAT miss signal when the translator means is not busy, pointer storing means in the translator means being set to indicate a register set which is to handle the translator received store request, and the transferring means inputting the translated address from the translator means to the STAR in the set handling the store request.

34. A storage control means as defined in claim 32, in which the sensing means further includes block transfer interference detection means for indicating the existence of a block transfer from main storage to a cache in which the block transfer contains the address of the store request, block completion means for indicating the end of the block transfer, and means for changing the store request from the redo register containing the store request to the STAR in the same set in response to the block completion means signalling the end of the block transfer.

35. A store sequence control means in a processor for handling multiple and overlappable store requests for accessing main storage during the occurrence of sequence disrupting events, the sequence control means receiving fetch and store requests from an instruction processing means and providing an output sequence of store requests to main storage having the same sequence as the store requests were received from the instruction processing means, the store sequence control means comprising a plurality of storage address registers (STARs) for respectively receiving storage addresses of the store requests received from the instruction processing means (IPM), each STAR having an ingate, an outgate, and a busy trigger, a STAR request to main storage being outputted by a respective STAR busy trigger when set, a plurality of data registers for receiving data from the IPM to be stored at addresses received in corresponding STARs, each data register having an ingate and an outgate, a plurality of redo registers corresponding to the STARs for receiving logical addresses of storage requests from a sequence disrupting means, each redo register having an ingate, an outgate and a busy trigger set when the redo register ingates a request, a redo request being outputted by any redo busy trigger when it is set, inpointer counter means being stepped by each store request accepted from the processor in a predetermined wrap-around count sequence to select a respective register group including corresponding STAR, data, and redo registers, a redo outpointer counter for selecting which of the set redo busy triggers is to signal a next redo request, disrupt signalling means for indicating the existence of each store sequence disrupting event by the sequence disrupting means, storage control priority means for determining which of contending store requests is to be next outgated to a storage control bus in which a redo request has highest priority, and a new processor store request has lowest priority, a respective accept signal being outputted by the storage control priority means for signalling an accepted store request, redo inpointer means for ingating a new processor store request address into the redo register selected by the current setting of the inpointer counter when the disrupt signalling means indicates the existence of a store sequence disrupting event, and setting the busy trigger for the ingated redo register, pointer control means for outgating each accepted redo request to the storage control bus and ingating the request into the corresponding STAR if no disruption for the request is signalled by the disrupt signalling means, but ingating the request back into the same redo register if a disruption is signalled for the request by the disrupt signalling means, main storage priority means for determining when fetch and store requests are to access main storage and providing a store priority signal for each allowed store access, an output counter for selecting one of the STARs to be next outgated to main storage, the output counter being stepped by each activation of the store priority signal, and STAR request means for signalling to the main storage priority means a STAR request for the STAR selected by the output counter when the corresponding STAR busy trigger is set.

36. A store sequence control means in a processor for handling multiple and overlappable store requests for accessing main storage during the occurrence of sequence disrupting events, the sequence control means receiving fetch and store requests from an instruction processing means and providing an output sequence of processor store requests to main storage having the same sequence as the store requests were received from an instruction processing means, each store request having an address and data, the store sequence control means comprising a plurality of storage address registers (STARs) for respectively receiving storage addresses of storage requests, each STAR having an ingate, an outgate, and a busy trigger, a STAR request to main storage being outputted by a respective STAR busy trigger when set, a plurality of data registers for receiving data to be stored at addresses in corresponding STARs, each data register having an ingate and an outgate, a plurality of redo registers corresponding to the STARs for receiving logical addresses of storage requests delayed by a sequence disrupting event such as by a DLAT miss or by a cache block fetch at the store request address, each redo register having an ingate, an outgate, and a busy trigger set when the redo register ingates a request, a redo request being outputted by any redo busy trigger when it is set, inpointer counter means being stepped by each received store request in a predetermined wrap-around count sequence to select a respective register group including corresponding STAR, data and redo registers, a redo outpointer counter for selecting which of the set redo busy triggers is to signal a next redo request, a translator for translating the logical address of a store request into a storage address, the translator having a pointer register, a busy trigger, and means for signalling a translator request when each translation is completed, storage control priority means for determining which of contending store requests is to be next outgated to a storage control bus in the priority contention order: (1) a redo request, (2) a translator request, and (3) a new processor store request, and a respective accept signal being outputted by the storage control priority means for signalling an accepted store request, redo inpointer means for ingating a new processor store request address into the redo register selected by the current setting of the inpointer counter when the accessing of the new store request must be delayed in an intervening event, setting the busy trigger for the ingated redo register, pointer control means for outgating each accepted redo request to the storage control bus and ingating the request into the corresponding STAR if no delaying even then exists, but ingating the request back into the same redo register if a delaying event then exits for the accepted redo request, main storage priority means for determining when a fetch and store requests are to access main storage and providing a store priority signal for each allowed store access, an output counter for selecting one of the STARs to be next outgated to main storage, the output counter being stepped by each activation of the store priority signal, and STAR request means for signalling to the main storage priority means a STAR request for the STAR selected by the output counter when the corresponding STAR busy trigger is set.

* * * * *